US012260572B2

(12) United States Patent
Jampani et al.

(10) Patent No.: US 12,260,572 B2
(45) Date of Patent: Mar. 25, 2025

(54) SINGLE IMAGE 3D PHOTOGRAPHY WITH SOFT-LAYERING AND DEPTH-AWARE INPAINTING

(71) Applicant: Google LLC, Mountain View, CA (US)

(72) Inventors: Varun Jampani, Rockland, MA (US); Huiwen Chang, Mountain View, CA (US); Kyle Sargent, Cambridge, MA (US); Abhishek Kar, Sunnyvale, CA (US); Richard Tucker, New York City, NY (US); Dominik Kaeser, New York City, NY (US); Brian L. Curless, Seattle, WA (US); David Salesin, Sausalito, CA (US); William T. Freeman, Acton, MA (US); Michael Krainin, Arlington, MA (US); Ce Liu, Belmont, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/907,529

(22) PCT Filed: Aug. 5, 2021

(86) PCT No.: PCT/US2021/044828
§ 371 (c)(1),
(2) Date: Sep. 27, 2022

(87) PCT Pub. No.: WO2023/014368
PCT Pub. Date: Feb. 9, 2023

(65) Prior Publication Data
US 2024/0249422 A1    Jul. 25, 2024

(51) Int. Cl.
*G06T 7/00* (2017.01)
*G06T 5/60* (2024.01)
(Continued)

(52) U.S. Cl.
CPC .............. *G06T 7/50* (2017.01); *G06T 5/60* (2024.01); *G06T 5/77* (2024.01); *G06T 2207/20081* (2013.01)

(58) Field of Classification Search
CPC .... G06T 7/50; G06T 5/60; G06T 5/77; G06T 2207/20081; G06T 2207/10004;
(Continued)

(56) References Cited

U.S. PATENT DOCUMENTS

| 8,666,146 | B1 * | 3/2014 | Smolic | ...................... G06T 3/18 |
| | | | | 348/42 |
| 9,113,043 | B1 * | 8/2015 | Kim | ........................ G06T 15/08 |
| 2021/0142497 | A1 * | 5/2021 | Pugh | ........................ G06T 7/194 |

OTHER PUBLICATIONS

Dhamo et al., "Peeking behind objects: Layered depth prediction from a single image," Pattern Recognition Letters, 2019, pp. 333-340, vol. 125.
(Continued)

*Primary Examiner* — Ping Y Hsieh
(74) *Attorney, Agent, or Firm* — McDonnell Boehnen Hulbert & Berghoff LLP

(57) ABSTRACT

A method includes determining, based on an image having an initial viewpoint, a depth image, and determining a foreground visibility map including visibility values that are inversely proportional to a depth gradient of the depth image. The method also includes determining, based on the depth image, a background disocclusion mask indicating a likelihood that pixel of the image will be disoccluded by a viewpoint adjustment. The method additionally includes generating, based on the image, the depth image, and the background disocclusion mask, an inpainted image and an inpainted depth image. The method further includes generating, based on the depth image and the inpainted depth image, respectively, a first three-dimensional (3D) representation of the image and a second 3D representation of the
(Continued)

inpainted image, and generating a modified image having an adjusted viewpoint by combining the first and second 3D representation based on the foreground visibility map.

20 Claims, 14 Drawing Sheets

(51) Int. Cl.
 *G06T 5/77* (2024.01)
 *G06T 7/50* (2017.01)
(58) Field of Classification Search
 CPC . G06T 2207/20221; G06T 5/50; G06T 7/593; G06T 5/75; G06T 7/194; G06T 2207/10028; H04N 13/261
 See application file for complete search history.

(56) References Cited

OTHER PUBLICATIONS

Hasinoff et al., "Boundary Matting for View Synthesis," 2004 Conference on Computer Vision and Pattern Recognition Workshop, 2004, 8 pages.
International Searching Authority, International Search Report and Written Opinion mailed on May 4, 2022, issued in connection with International Patent Application No. PCT/US2021/044828 filed on Aug. 5, 2021, 14 pages.
Kopf et al., "One Shot 3D Photography," ACM Trans. Graph., 2020, 13 pages, vol. 39, No. 4, Article 76.
Pitié et al., "Matting With A Depth Map," Proceedings of 2010 IEEE 17th International Conference on Image Processing (ICIP), Sep. 26-29, 2010, Hong Kong, 4 pages.
Shih et al., "3D Photography using Context-aware Layered Depth Inpainting," 2020 IEEE/CVF Conference on Computer Vision and Pattern Recognition (CVPR), 2020, pp. 8025-8026.
Volino et al., "Layered View-Department Texture Maps," Visual Media Production, ACM, Nov. 2013, 8 pages.
Barnes et al., "PatchMatch: A Randomized Correspondence Algorithm for Structural Image Editing," ACM Transactions on Graphics (Proc. SIGGRAPH), Aug. 2009, 10 pages, vol. 28, No. 3.
Belhumeur, Peter N., "A Bayesian approach to binocular steropsis," International Journal of Computer Vision, 1996, pp. 237-260, vol. 19 (Abstract).
Bertalmio et al., "Image Inpainting," In Proceedings of the 27th Annual Conference on Computer Graphics and Interactive Techniques, 2000, pp. 417-424.
Boss et al., "NeRD: Neural Reflectance Decomposition from Image Collections," In The IEEE International Conference on Computer Vision (ICCV), 2021, 15 pages.
Chen et al., "Single-Image Depth Perception in the Wild," In Advances in Neural Information Processing Systems (NIPS), 2016, pp. 730-738.
Flynn et al., "DeepView: View Synthesis with Learned Gradient Descent," In The IEEE Conference on Computer Vision and Pattern Recognition (CVPR), 2019, 10 pages.
Flynn et al., "DeepStereo: Learning to Predict New Views from the World's Imagery," In IEEE Conference on Computer Vision and Pattern Recognition (CVPR), 2016, 9 pages.
Forte et al., "F, B, Alpha Matting," arXiv:2003.07711v1, Mar. 17, 2020, 17 pages.
Garg et al. "Learning Single Camera Depth Estimation Using Dual-Pixels," In IEEE Conference on Computer Vision and Pattern Recognition (CVPR), 2019, 19 pages.
Garg et al. "Unsupervised CNN for Single View Depth Estimation: Geometry to the Rescue," In European Conference on Computer Vision (ECCV), 2016, 16 pages.
Genova et al., "Unsupervised Training for 3D Morphable Model Regression," In Proceedings of the IEEE Conference on Computer Vision and Pattern Recognition, 2018, pp. 8377-8386.
Gortler et al., "The Lumigraph," In Proceedings of SIGGRAPH 96, Annual Conference Series, 1996, pp. 43-52.
Huang et al., "Image Completion using Planar Structure Guidance," ACM Trans. Graph., Jul. 2014, 10 pages vol. 33, No. 4.
Kalantari et al., "Learning-Based View Synthesis for Light Field Cameras," ACM Trans. Graph., 2016, pp. 193:1-193:10, vol. 35, No. 6.
Kopf et al., "Practical 3D Photography," In Proceedings of CVPR Workshops, 2019, 4 pages.
Kopf et al., "One Shot 3D Photography," ACM Transactions on Graphics (TOG), 2022, pp. 76-1 to 76-13, vol. 39, No. 4.
Levoy et al., "Light Field Rendering," In Proceedings of SIGGRAPH 96, Annual Conference Series, 1996, 12 pages.
Li et al., "Synthesizing Light Field from a Single Image with Variable MPI and Two Network Fusion," ACM Transactions on Graphics, 202, 10 pages, vol. 39, No. 6.
Li et al., "Learning the Depths of Moving People by Watching Frozen People," In The IEEE Conference on Computer Vision and Pattern Recognition (CVPR), Jun. 2019, 10 pages.
Li et al., "MegaDepth: Learning Single-View Depth Prediction from Internet Photos," In The IEEE Conference on Computer Vision and Pattern Recognition (CVPR), Jun. 2018, 10pages.
Liu et al., "Coherent Semantic Attention for Image Inpainting," In Proceedings of the IEEE International Conference on Computer Vision, 2019, 20 pages.
Martin-Brualla et al., "NeRF in the wild: Neural radiance fields for unconstrained photo collections," In IEEE Conference on Computer Vision and Pattern Recognition (CVPR), 2021, 15 pages.
Meshry et al., "Neural Rerendering in the Wild," In Computer Vision and Pattern Recognition (CVPR), 2019, 16 pages.
Mildenhall et al., "NeRF: Representing Scenes as Neural Radiance Fields for View Synthesis," In European Conference on Computer Vision (ECCV), 2020, 25 pages.
Niklaus et al., "3D Ken Burns Effect from a Single Image," ACM Transactions on Graphics (TOG), 2019, 15 pages, vol. 28, No. 6, Article 184.
Penner et al., "Soft 3D Reconstruction for View Synthesis," ACM Trans. Graph., 2017, 11 pages, vol. 36, No. 6, Article 235.
Qin et al., "U2-net: Going Deeper with Nested U-Structure for Salient Object Detection," Pattern Recognition, 2020, Jan. 2020, 15 pages.
Ranftl et al., "Towards Robust Monocular Depth Estimation: Mixing Ddatasets for Zero-shot Cross-dataset Transfer," IEEE Transactions on Pattern Analysis and Machine Intelligence (TPAMI), 2020, 14 pages.
Shade et al., "Layered Depth Images," In Proceedings of SIGGRAPH 98, 1998, 12 pages.
Shih et al., "3D Photography using Context-aware Layered Depth Inpainting," In IEEE Conference on Computer Vision and Pattern Recognition (CVPR), 2020, 15 pages.
Srinivasan et al., "Pushing the Boundaries of View Extrapolation with Multiplane Images," In The IEEE Conference on Computer Vision and Pattern Recognition (CVPR), Jun. 2019, 12 pages.
Srinivasan et al., "Learning to Synthesize a 4D RGBD Light Field from a Single Image," In The IEEE Inter-national Conference on Computer Vision (ICCV), Oct. 2017, 9 pages.
Tucker et al., "Single-view View Synthesis with Multiplane Images," In IEEE Conference on Computer Vision and Pattern Recognition (CVPR), 2020, 10 pages.
Tulsiani et al., "Layer-structured 3D Scene Inference via View Synthesis," In The European Conference on Computer Vision (ECCV), Sep. 2018, 18 pages.
Unsplash Dataset, https://unsplash.com/data, 2020, 4 pages.
Wang et al., "Improving Deep Stereo Network Generalization with Geometric Priors," arXiv:2008.11098v1, Aug. 25, 2020, 8 pages.
Wang et al., "Local detection of stereo occlusion boundaries," In IEEE Conference on Computer Vision and Pattern Recognition (CVPR), 2019, pp. 3818-3827.
Weickert, Joachim, "Coherence-Enhancing Diffusion Filtering," International Journal of Computer Vision, 1999, pp. 111-127, vol. 31 (Abstract).

(56) References Cited

OTHER PUBLICATIONS

Wiles et al., SynSin: End-to-end View Synthesis from a Single Image, In IEEE Conference on Computer Vision and Pattern Recognition (CVPR), 2020, 22 pages.

Yi et al., "Contextual Residual Aggregation for Ultra High-Resolution Image Inpainting," In IEEE Conference on Computer Vision and Pattern Recognition (CVPR), 2020, 22 pages.

Yu et al., "Free-Form Image Inpainting with Gated Convolution," arXiv:1806.03589v2, Oct. 22, 2019, 17 pages.

Yu et al., "Generative Image Inpainting with Contextual Attention," In IEEE Conference on Computer Vision and Pattern Recognition (CVPR), 2018, 15 pages.

Zhang et al., "The Unreasonable Effectiveness of Deep Features as a Perceptual Metric," In IEEE Conference on Computer Vision and Pattern Recognition (CVPR), 2018, 14 pages.

Zhou et al., "Places: An Image Database for Deep Scene Understanding," arXiv:1610.02055v1, Oct. 6, 2016, 12 pages.

Zhou et al., "Stereo Magnification: Learning view synthesis using multiplane images," ACM Transactions on Graphics (TOG), 2018, pp. 1-12, vol. 37, No. 4.

\* cited by examiner

RE10K DATASET

| TESTED MODELS | LPIPS ↓ | | PSNR ↑ | | SSIM ↑ | |
|---|---|---|---|---|---|---|
| | T = 5 | T = 10 | T = 5 | T = 10 | T = 5 | T = 10 |
| SYNSIN | 0.31 | 0.34 | 22.7 | 20.6 | 0.72 | .67 |
| SMPI | 0.14 | 0.19 | 26.7 | 24.1 | 0.86 | 0.80 |
| 3D-PHOTO | 0.09 | 0.12 | 26.9 | 23.7 | 0.87 | 0.80 |
| SYSTEM 300 | 0.06 | 0.10 | 27.1 | 23.7 | 0.87 | 0.80 |

Figure 7A

DUAL PIXELS DATASET

| TESTED MODELS | LPIPS ↓ | PSNR ↑ | SSIM ↑ |
|---|---|---|---|
| SYNSIN | 0.75 | 12.9 | 0.31 |
| SMPI | 0.49 | 16.3 | 0.42 |
| 3D-PHOTO | 0.27 | 16.3 | 0.42 |
| SYSTEM 300 | 0.23 | 16.8 | 0.44 |

Figure 7B

MANNEQUIN CHALLENGE DATASET

| TESTED MODELS | LPIPS ↓ | PSNR ↑ | SSIM ↑ |
|---|---|---|---|
| SYNSIN | 0.33 | 16.9 | 0.53 |
| SMPI | 0.31 | 17.8 | 0.59 |
| 3D-PHOTO | 0.22 | 18.8 | 0.60 |
| SYSTEM 300 | 0.18 | 20.0 | 0.66 |

Figure 7C

SINGLE IMAGE 3D PHOTOGRAPHY WITH SOFT-LAYERING AND DEPTH-AWARE INPAINTING

CROSS-REFERENCE TO RELATED APPLICATIONS

The present application is a National Stage Application under 35 U.S.C. § 371 and claims priority to International Patent Application No. PCT/US2021/044828, filed Aug. 5, 2021, and titled "Single Image 3D Photography with Soft-Layering and Depth-aware Inpainting," which is incorporated herein by reference in its entirety.

BACKGROUND

Machine learning models may be used to process various types of data, including images, to generate various desirable outputs. Improvements in the machine learning models allow the models to carry out the processing of data faster, to utilize fewer computing resources for the processing, and/or to generate outputs that are of relatively higher quality.

SUMMARY

A three-dimensional (3D) photo system may be configured to generate, based on a monocular image, a 3D viewing effect/experience that simulates different viewpoints of the scene represented by the monocular image. Specifically, a depth image may be generated based on the monocular image. A soft foreground visibility map may be generated based on the depth image, and may indicate a transparency of different parts of the monocular image to a background layer. The monocular image may be considered to form part of a foreground layer. A soft background disocclusion mask may be generated based on the depth image, and may indicate a likelihood of different background regions of the monocular image being disoccluded as a result of viewpoint changes. The soft background disocclusion mask may be used by an inpainting model to inpaint disoccluded background regions of the monocular image and the depth image, thereby generating the background layer. The foreground layer and the background layer may be represented in 3D, and these 3D representations may be projected from a new viewpoint to generate a new foreground image and a new background image. The new foreground image and the new background image may be combined according to the soft foreground visibility map as reprojected into the new viewpoint, thereby generating a modified image having the new viewpoint of the scene.

In a first example embodiment, a method includes obtaining a monocular image having an initial viewpoint, and determining, based on the monocular image, a depth image that includes a plurality of pixels. Each respective pixel of the depth image may have a corresponding depth value. The method also includes determining, for each respective pixel of the depth image, a corresponding depth gradient associated with the respective pixel of the depth image, and determining a foreground visibility map that includes, for each respective pixel of the depth image, a visibility value that is inversely proportional to the corresponding depth gradient. The method additionally includes determining, based on the depth image, a background disocclusion mask that includes, for each respective pixel of the depth image, a disocclusion value indicating a likelihood that a corresponding pixel of the monocular image will be disoccluded by a change in the initial viewpoint. The method yet additionally includes generating (i) an inpainted image by inpainting, using an inpainting model, portions of the monocular image in accordance with the background disocclusion mask and (ii) an inpainted depth image by inpainting, using the inpainting model, portions of the depth image in accordance with the background disocclusion mask. The method further includes generating (i), based on the depth image, a first three-dimensional (3D) representation of the monocular image and (ii), based on the inpainted depth image, a second 3D representation of the inpainted image. The method yet further includes generating a modified image having an adjusted viewpoint that is different from the initial viewpoint by combining the first 3D representation with the second 3D representation in accordance with the foreground visibility map.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5B illustrates a background occlusion mask, in accordance with examples described herein.

FIGS. 7A, 7B, and 7C include tables of performance metrics, in accordance with examples described herein.

DETAILED DESCRIPTION

Figure 1:
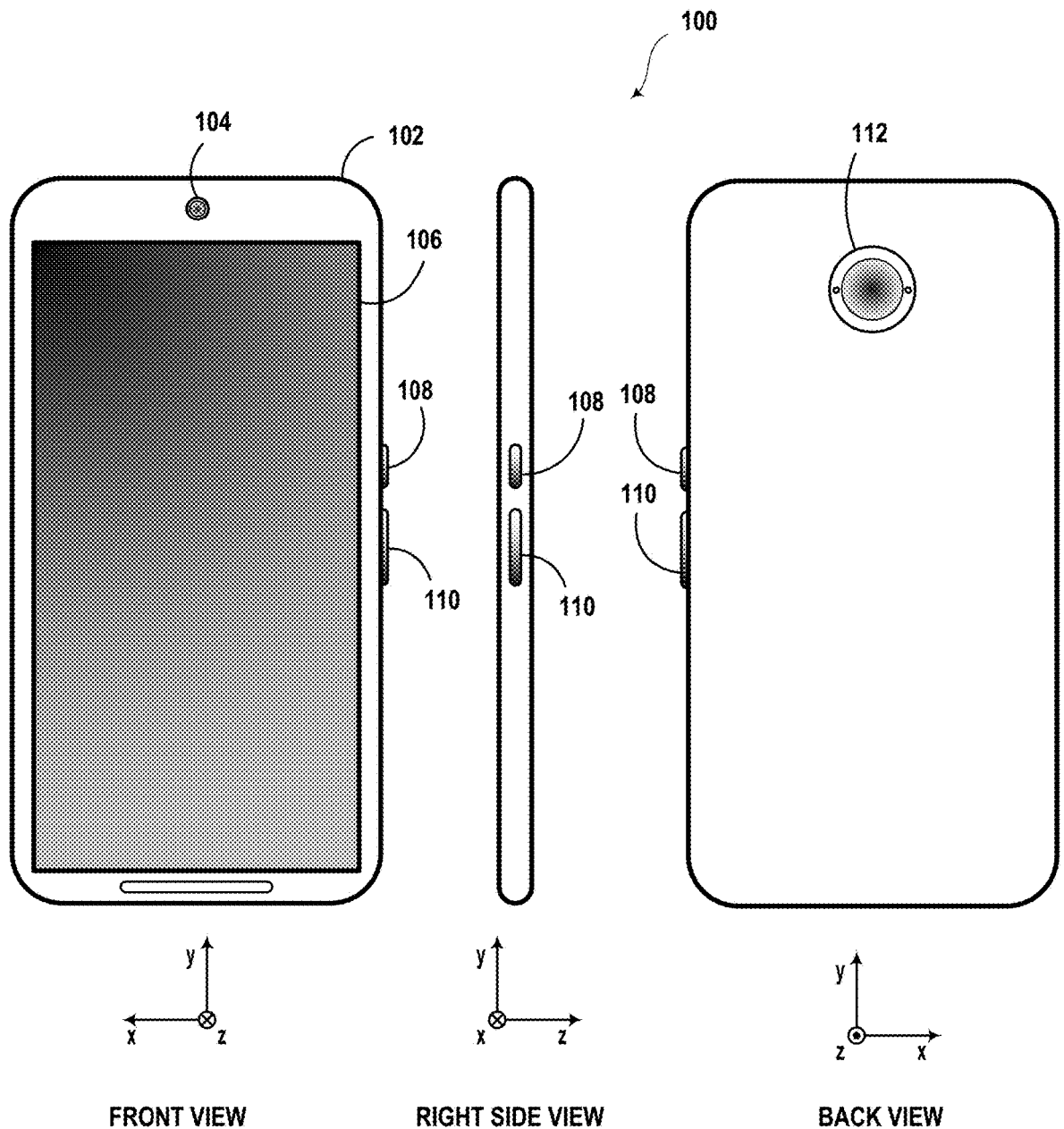
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A monocular image that represents a scene from an initial viewpoint may be used to generate modified images that represent the scene from adjusted viewpoints. By sequentially viewing the monocular image and/or the modified images, a 3D effect may be simulated, thereby creating a richer and/or more interactive viewing experience. In particular, this viewing experience may be created using a single monocular image that has been generated without involving additional optical hardware beyond that of a monoscopic camera.

Some techniques for generating images with modified viewpoints may rely on decomposing a scene into two or more layers based on hard discontinuities. Hard discontinuities may define a sharp and/or discrete (e.g., binary) transition between two layers (e.g., foreground and background). Hard discontinuities might not allow for accurate modeling of some appearance effects, such as very thin objects (e.g., hair), resulting in a visually-flawed or deficient 3D effect. Other techniques for generating images with modified viewpoints may rely on training datasets that include multi-view images that provide ground-truth for different viewpoints. However, it may be difficult to obtain a multi-view data set that is representative of a wide range of scenes, and these approaches may thus perform poorly with respect to out-of-distribution scenes that have not been adequately represented by the training data distribution.

Accordingly, provided herein is a 3D photo system that relies on soft-layering formulations and depth-aware inpainting to decompose a given scene into a foreground layer and a background layer. These layers may be combined to generate a modified image from a new viewpoint. Specifically, a depth model may be used to generate a depth image corresponding to a monocular image, and the depth image may be used to generate a soft foreground visibility map and/or a soft background disocclusion mask.

The soft foreground visibility map may be generated based on a depth gradient of the depth image, and may indicate an extent to which different portions of the foreground layer are transparent, and thus allow for corresponding regions of the background layer to be seen through the foreground layer. The foreground visibility map may be soft in that it is generated by a soft foreground visibility function that is continuous and smooth at least along a range of input values of the depth gradient. The foreground layer may be defined by the monocular image and the foreground visibility map. In some implementations, the soft foreground visibility map may also be based on a foreground alpha matte, which may improve the representation of thin and/or high-frequency features such as hair and/or fur.

The soft background disocclusion mask may be generated based on the depth image to quantify a likelihood of different pixels of the monocular image being disoccluded by a change in the viewpoint. The background disocclusion mask may be soft in that it is generated by a soft background disocclusion function that is continuous and smooth at least along the range of input values of the depth image. The terms "map" and "mask" may be used interchangeably to refer to a grayscale image and/or a binary image.

The soft background disocclusion mask may be used by an inpainting model to inpaint parts of the monocular image and the depth image that could be disoccluded, thereby generating the background layer. In particular, the same inpainting model may be trained to inpaint the monocular image and the corresponding depth image, such that inpainted pixel values are based on both the color/intensity values of the monocular image and the depth values of the depth image. The inpainting model may be trained on both image and depth data such that it is trained to perform depth-aware inpainting. The inpainting model may, for example, be trained to inpaint the monocular image and the corresponding depth image concurrently. Accordingly, the inpainting model may be configured to inpaint disoccluded background regions by borrowing information from other background regions, rather than by borrowing information from foreground regions, resulting in a background layer that is visually consistent. Additionally, the inpainting model may be configured to inpaint the monocular image and the depth image in a single iteration of (e.g., a single processing pass through) the inpainting model, rather than using a plurality of iterative passes.

Respective 3D representations of the foreground layer and the background layer may be generated based on the depth image and the inpainted depth image, respectively. A viewpoint from which these 3D representations are observed may be adjusted, and the 3D representations may be projected to generate a foreground image and a background image having the adjusted viewpoint. The foreground image and the background image may then be combined in accordance with a modified foreground visibility map that also has the adjusted viewpoint. Thus, disoccluded regions in the foreground layer may be filled in based on corresponding regions of the background layer, with the transitions between foreground and background including a blending of both the foreground layer and the background layer.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
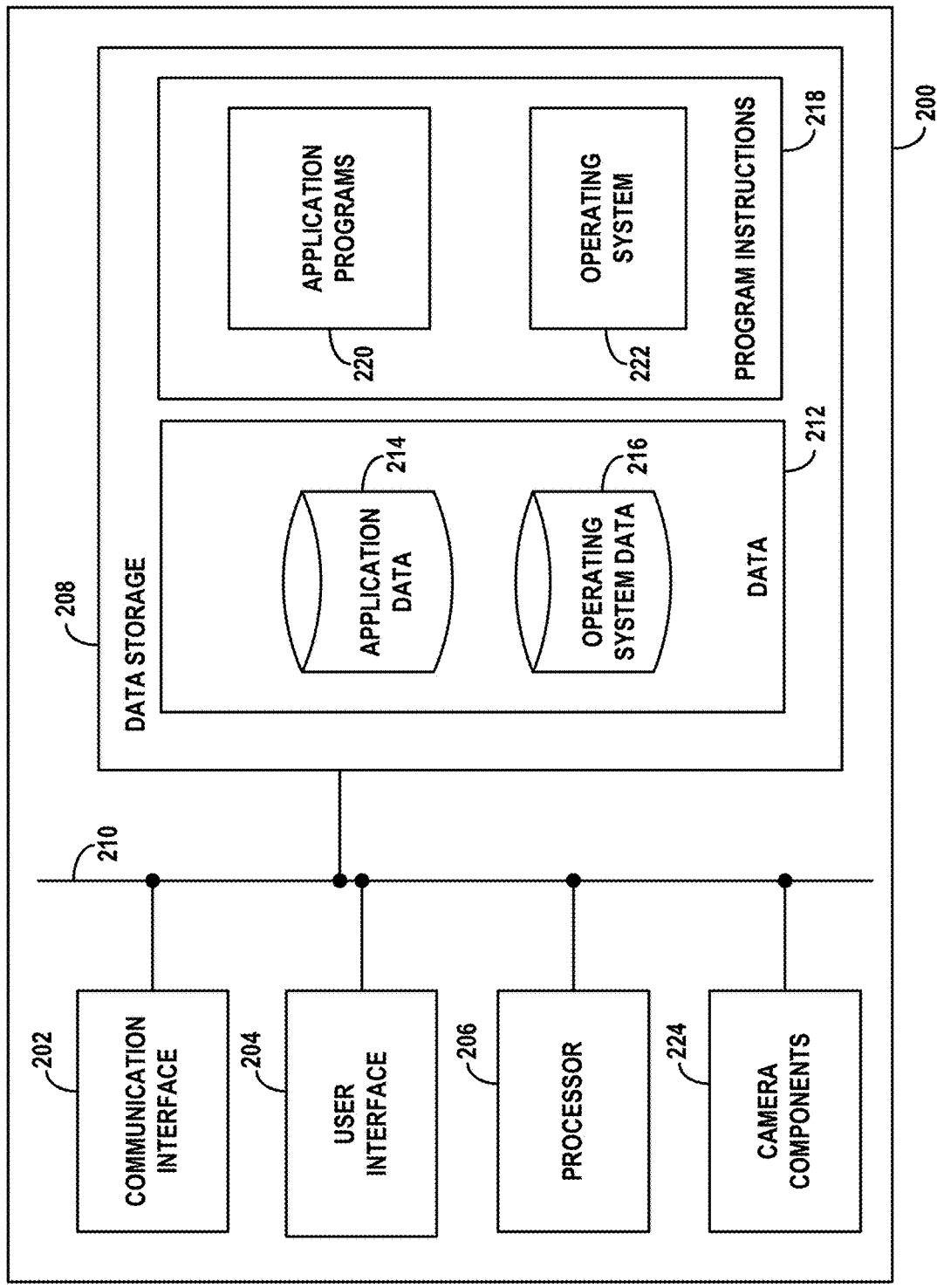
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers—1 millimeter), among other possibilities. Camera components 224 may be controlled at least in part by software executed by processor 206.

III. EXAMPLE 3D PHOTO SYSTEM

Figure 3A:
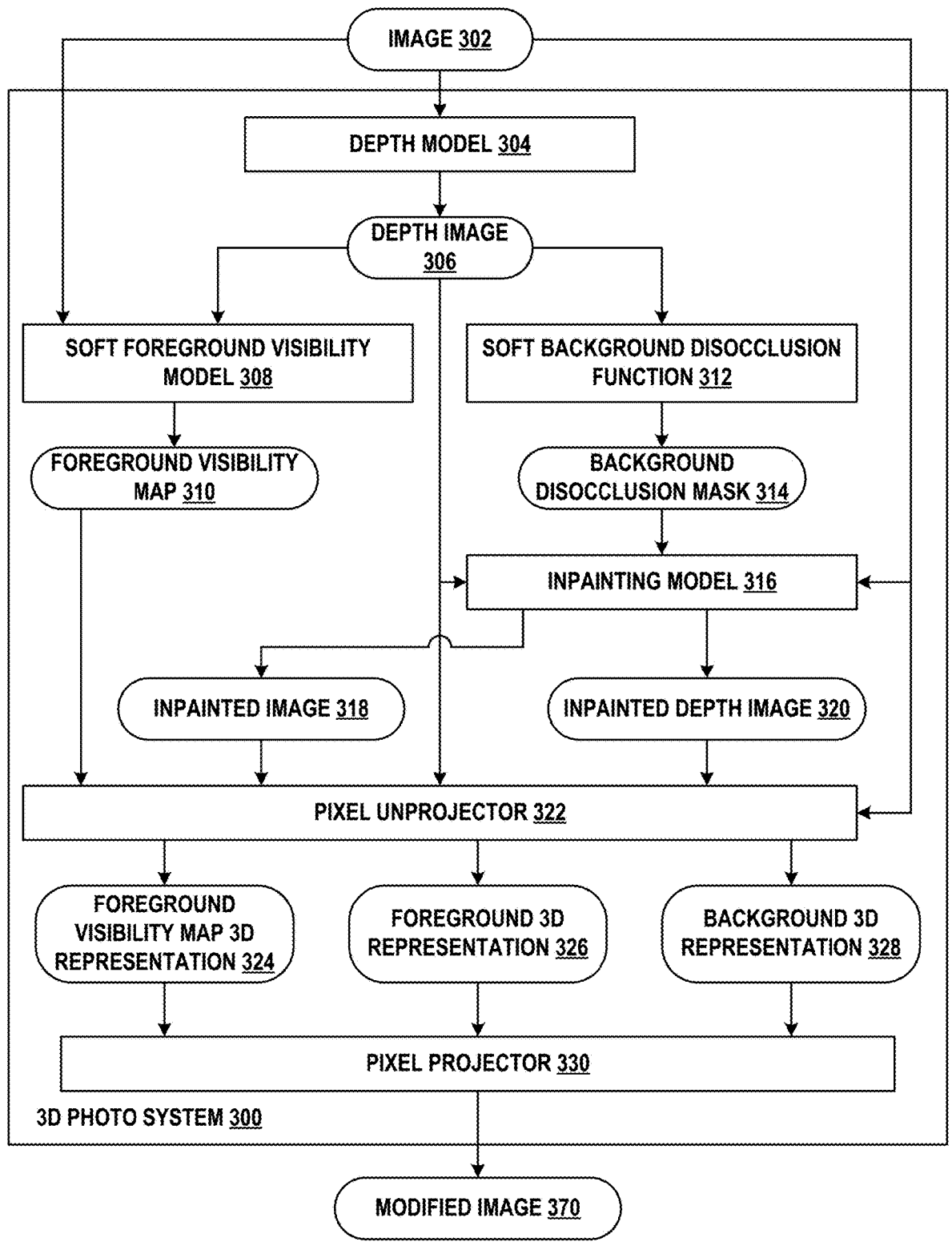
FIG. 3A illustrates a 3D photo system, in accordance with examples described herein.

FIG. 3A illustrates an example system for generating 3D photos based on a monocular image. Specifically, 3D photo system 300 may be configured to generate modified image 370 based on image 302. 3D photo system 300 may include depth model 304, soft foreground visibility model 308, soft background disocclusion function 312, inpainting model 316, pixel unprojector 322, and pixel projector 330.

Image 302 may be a monocular/monoscopic image that includes a plurality of pixels, each of which may be associated with one or more color values (e.g., a red-green-blue color image) and/or intensity values (e.g., a grayscale image). Image 302 may have an initial viewpoint from which it has been captured by a camera. This initial viewpoint may be represented by initial camera parameters that indicate a spatial relationship between the camera and a world reference frame of the scene represented by image 302. For example, the world reference frame may be defined such that it is initially aligned with a camera reference frame.

Modified image 370 may represent the same scene as image 302 from an adjusted viewpoint that is different from the initial viewpoint. The adjusted viewpoint may be represented by adjusted camera parameters that are different from the initial camera parameters and that indicate an adjusted spatial relationship between the camera and the world reference frame in the scene. Specifically, in the adjusted spatial relationship, the camera reference frame may be rotated and/or translated relative to the world reference frame. Accordingly, by generating one or more instances of modified image 370 and viewing them in a sequence, a 3D photo effect may be achieved due to changes in the viewpoint from which the scene represented by image 302 is observed. This may allow image 302 to appear visually richer and/or more interactive by simulating camera motion relative to the scene.

Depth model 304 may be configured to generate depth image 306 based on image 302. Image 302 may be expressed as $I \in R^{n \times 3}$. Image 302 may thus have n pixels, each of which may be associated with 3 color values (e.g., red, green, and blue). Depth image 306 may be expressed as $D=\Phi_D(I)$, where $D \in R^{n \times 1}$, and $\Phi_D$ represents depth model 304. Depth image 306 may thus have n pixels, each of which may be associated with a corresponding depth value. The depth values may be scaled to a predetermined range, such as 0 to 1 (i.e., $D \in [0, 1]^n$). In some implementations, the depth values may represent a disparity, rather than metric depth, and may be converted to metric depth by appropriate inversion of the disparity. Depth model 304 may be a machine learning model that has been trained to generate depth images based on monocular images. For example, depth model 304 may represent the MiDaS model, as discussed in a paper titled "Towards Robust Monocular Depth Estimation: Mixing Datasets for Zero-shot Cross-dataset Transfer," authored by Ranftl et al., and published as arXiv:1907.01341v3. Additionally or alternatively, depth model 304 may be configured to generate depth image 306 using other techniques and/or algorithms, some of which may be based on additional image data corresponding to image 302.

Soft foreground visibility model 308 may be configured to generate foreground visibility map 310 based on depth image 306. Foreground visibility map 310 may alternatively be referred as soft foreground visibility map 310. Foreground visibility map 310 may be expressed as $A \in R^n$. Foreground visibility map 310 may thus have n pixels, each of which may be associated with a corresponding visibility value (which may be referred to as a foreground visibility value). The visibility values may be selected from and/or scaled to a predetermined range, such as 0 to 1 (i.e., $A \in [0, 1]^n$). In some cases, the visibility values may instead be expressed as transparency values, since visibility of the foreground and transparency of the foreground are complements of one another. That is, the nth transparency value may be expressed as $A_n^{-1}=1-A_n$, since $A_n^{-1}+A_n=1$. Accordingly, it is to be understood that, whenever discussed herein, a visibility value may be expressed explicitly in terms of visibility or, equivalently, implicitly in terms of transparency.

Within examples, a function may be considered "soft" in that, along at least a particular input interval, the function is continuous and/or smooth. A function may be considered "hard" in that, along at least the particular input interval, the function is not continuous and/or smooth. A map or mask may be considered "soft" when it has been generated using a soft function, rather than using a hard function. In particular, the map or mask itself might not be continuous and/or smooth, but may nevertheless be considered "soft" if it has been generated by a soft function.

Soft foreground visibility model 308 may be configured to generate foreground visibility map 310 based on a depth gradient of depth image 306 and possibly also based on a foreground alpha matte of image 302. Visibility values of foreground visibility map 310 may be relatively low (and corresponding transparency values may thus be relatively high) at pixel locations that represent a transition from foreground features of image 302 to background features of image 302. Visibility values of foreground visibility map 310 may be relatively high (and corresponding transparency values may thus be relatively low) at pixel locations that do not represent a transition from the foreground features to the background features. The visibility values may thus allow features that are disoccluded by a change in viewpoint to be at least partly seen through content of the foreground. Additional details of soft foreground visibility model 308 are shown in and discussed with respect to FIGS. 4A, 4B, 4C, and 4D.

Soft background disocclusion function 312 may be configured to generate background disocclusion mask 314 based on depth image 306. Background disocclusion mask 314 may alternatively be referred as soft background disocclusion mask 314. Background disocclusion mask 314 may be expressed as $S \in R^n$. Background disocclusion mask 314 may thus have n pixels, each of which may be associated with a corresponding disocclusion value (which may be referred to as a background disocclusion value). The disocclusion values may be selected from and/or scaled to a predetermined range, such as 0 to 1 (i.e., $S \in [0, 1]^n$).

Each respective disocclusion value of background disocclusion mask 314 may indicate a likelihood that a corresponding pixel of the image 302 will be disoccluded (i.e., made visible) by a change in the initial viewpoint of image 302. Specifically, a given pixel associated with pixel location (x, y) may be disoccluded due to the change in the initial viewpoint if there exists a neighboring reference pixel $(x_i, y_j)$ such that a depth difference between (i) a depth value D(x, y) associated with the given pixel and (ii) a depth value $D(x_i, y_j)$ associated with the neighboring reference pixel is greater than a scaled distance $\rho K(x_i, y_j)$ between these pixels' respective positions. That is, the given pixel at location (x, y) may be disoccluded if $\exists_{(x_i, y_j)}(D(x, y) - D(x_i, y_j)) > \rho K_{(x_i, y_j)}$, where $\rho$ is a scalar parameter that may be used when depth image 306 represents disparity in order to scale the disparity to metric depth, where a value of $\rho$ may be selected based on a maximum assumed camera movement between the initial and modified viewpoints, and where $K_{(x_i, y_j)} = \sqrt{(x_i - x)^2 + (y_i - y)^2}$. Thus, the given pixel may be more likely to be disoccluded by a change in the initial viewpoint if the corresponding depth is relatively low (or the corresponding disparity is relatively high) compared to surrounding pixels, since features closer to the camera will, as the viewpoint changes, appear to move around more within image 302 than features that are farther away.

Accordingly, soft background disocclusion function 312 may be expressed as $S_{(x,y)} = \tan h(\gamma(\max_{(x_i, y_j)}(D(x,y) - D_{(x_i, y_j)} - \rho K_{(x_i, y_j)})))$, where $\gamma$ is an adjustable parameter that controls a steepness of the hyperbolic tangent function, i and j are each iterated through a corresponding range to compare the given pixel (x, y) to a predetermined number of neighboring pixels $(x_i, y_j)$, and a rectified linear unit (ReLU) or a leaky ReLU may be applied to the output of the hyperbolic tangent function to make $S_{(x,y)}$ positive. In particular, $(x_i, y_j) \in N_{(x,y)}$, where $N_{(x,y)}$ represents a fixed neighborhood of m pixels around the given pixel at location (x, y). The value of m and the shape of $N_{(x,y)}$ may be selected based on, for example, a computational time allotted to determination of background disocclusion mask 314. For example, $N_{(x,y)}$ may define a square, a rectangle, an approximately circular area, or two or more scanlines. The two or more scanlines may include a vertical scanline that includes a predetermined number of pixels above and below the given pixel (x, y) and/or a horizontal scanline that includes the predetermined number of pixels on a right side and on a left side of the given pixel (x, y).

Thus, soft background disocclusion function 312 may be configured to determine, for each respective pixel of depth image 306, a first plurality of difference values, where each respective difference value of the first plurality of difference values is determined by subtracting, from the corresponding depth value D (x, y) of the respective pixel, (i) the corresponding depth value $D_{(x_i, y_j)}$ of a corresponding reference pixel located within a predetermined pixel distance of the respective pixel and (ii) a scaled number of pixels $\rho K_{(x_i, y_j)}$ separating the respective pixel from the corresponding reference pixel. Further, soft background disocclusion function 312 may be configured to, for each respective pixel of depth image 306, determine a first maximum difference value of the first plurality of difference values (i.e., $\max_{(x_i,y_j)}(D(x, y)-D(x_i, y_j)-\rho K_{(x_i,y_j)}))$, and determine the disocclusion value $S_{(x,y)}$ by applying a hyperbolic tangent function to the first maximum difference value.

Inpainting model 316 may be configured to generate inpainted image 318 and inpainted depth image 320 based on image 302, depth image 306, and background disocclusion mask 314. Inpainted image 318 may be expressed as $\tilde{I} \in R^{n \times 3}$, and inpainted depth image 320 may be expressed as $\tilde{D} \in R^{n \times 1}$. Inpainted image 318 and inpainted depth image 320 may thus each have n pixels. Inpainting model 316 may implement the function $\{\tilde{I}, \tilde{D}\} = \Theta(I, D, S)$, where $\{\tilde{I}, \tilde{D}\}$ represents a depth-wise concatenation of inpainted image 318 and inpainted depth image 320 and $\Theta(\cdot)$ represents inpainting model 316.

Specifically, inpainted image 318 may represent image 302 inpainted according to background disocclusion mask 314, while inpainted depth image 320 may represent depth image 306 inpainted according to background disocclusion mask 314. A change to the initial viewpoint may result in apparent movement of one or more foreground regions, resulting in corresponding background regions (indicated by background disocclusion mask 314) becoming visible. Since image 302 and depth image 306 do not contain pixel values for these background regions, inpainting model 316 may be used to generate these pixel values. Accordingly, inpainted image 318 and inpainted depth image 320 may be considered to form a background layer, while image 302 and depth image 306 form a foreground layer. These layers may be combined as part of generation of modified image 370.

Inpainting model 316 may be trained to inpaint the background regions with values that match other background regions in image 302, rather than values that match the foreground regions of image 302. Additionally or alternatively, inpainting model 316 may be configured to generate inpainted image 318 and inpainted depth image 320 in parallel and/or concurrently. For example, both inpainted image 318 and inpainted depth image 320 may be generated by a single pass/iteration of inpainting model 316. Accordingly, an output of inpainting model 316 may be a depth-wise concatenation of inpainted image 318 and inpainted depth image 320, and each of these inpainted images may thus be represented by corresponding one or more channels of the output.

Both inpainted image 318 and inpainted depth image 320 may be based on image 302 and depth image 306 such that the pixel values of inpainted portions of inpainted image 318 are consistent with depth values of corresponding inpainted portions of inpainted depth image 320. That is, inpainting model 316 may be configured to consider both the depth information and the color/intensity information in generating a value for a disoccluded background region, resulting in inpainted regions that exhibit consistency in depth and color/intensity. The depth information may allow inpainting model 316 to distinguish between foreground regions and background regions of image 302, and thus select appropriate portions from which to borrow values for inpainting. Accordingly, inpainting model 316 may be considered to be depth-aware. Additional details of inpainting model 316 are shown in and discussed with respect to FIG. 5A.

Pixel unprojector 322 may be configured to generate (i) foreground visibility map 3D representation 324 based on foreground visibility map 310 and depth image 306, (ii) foreground 3D representation 326 based on image 302 and depth image 306, and (iii) background 3D representation 328 based on inpainted image 318 and inpainted depth image 320. Specifically, pixel unprojector 322 may be configured to back-project each respective pixel of foreground visibility map 310, image 302, and inpainted image 318 to generate a corresponding 3D point to represent the respective pixel within a 3D camera reference frame. Thus, 3D points of foreground visibility map 3D representation may be expressed as $V(p)=D(p)M^{-1}\tilde{p}$, 3D points of foreground 3D representation 326 may be expressed as $F(p)=D(p)M^{-1}\tilde{p}$, and 3D points of background 3D representation 326 may be expressed as $B(p)=\tilde{D}(p)M^{-1}\tilde{p}$, where p represents the respective pixel, $\tilde{p}$ represents the homogenous augmentation of coordinates of the respective pixel, M represents the intrinsic camera matrix with the principal point at the center of image 302, D (p) represents the depth value (rather than the inverse depth value) corresponding to the respective pixel as represented in depth image 306, $\tilde{D}(p)$ represents the depth value (rather than the inverse depth value) corresponding to the respective pixel as represented by inpainted depth image 320, and the camera reference frame is assumed to be aligned with the world reference frame. Since $V(p)=F(p)$, a single set of 3D points may be determined for and shared by 3D representations 324 and 326.

Based on the respective 3D points determined to represent pixels of foreground visibility map 310, image 302, and inpainted image 318, pixel unprojector 322 may be configured to connect 3D points that correspond to adjoining pixels, thereby generating a respective polygonal mesh (e.g., triangle mesh) for each of foreground visibility map 310, image 302, and inpainted image 318. Specifically, a given 3D point may be connected to one or more other 3D points if the pixel corresponding to the given 3D point and the pixels(s) corresponding to the one or more other 3D points adjoin one another within the corresponding image.

Pixel unprojector 322 may further be configured to texture each respective polygonal mesh based on the pixel values of the corresponding image or map. Specifically, the polygonal mesh of foreground visibility map 3D representation 324 may be textured based on corresponding values of foreground visibility map 310, the polygonal mesh of foreground 3D representation 326 may be textured based on corresponding values of image 302, and the polygonal mesh of background 3D representation 328 may be textured based on corresponding values of inpainted image 318. When a single set of 3D points is determined for and shared by 3D representations 324 and 326, 3D representations 324 and 326 may also be represented using a single polygonal mesh that includes a plurality of channels, with one or more first channels representing values of foreground visibility map 310 and one or more second channels representing values of image 302. Additionally or alternatively, 3D representations 324, 326, and 328 may include point clouds, layered representations (e.g., layered depth images), multiplane images, and/or implicit representations (e.g., neural radiance fields (NeRF)), among other possibilities.

Pixel projector 330 may be configured to generate modified image 370 based on 3D representations 324, 326, and 328. Specifically, pixel projector 330 may be configured to perform a rigid transformation T that represents a translation and/or a rotation of the camera relative to a camera pose associated with the initial viewpoint. This rigid transformation T may thus represent the adjusted camera parameters that define the adjusted viewpoint for modified image 370. For example, the rigid transformation T may be expressed relative to the world reference frame associated with the initial viewpoint of image 302. The value of T may be adjustable and/or iterable to generate a plurality of different instances of modified image 370, each of which represents image 302 from a corresponding adjusted viewpoint.

Specifically, based on the rigid transformation T, pixel projector 330 may be configured to (i) project foreground visibility map 3D representation 324 to generate a modified foreground visibility map $A_T$, (ii) project foreground 3D representation 326 to generate foreground image $I_T$, and (iii) project background 3D representation 328 to generate background image $\tilde{I}_T$. Thus, the modified foreground visibility map $A_T$ may represent foreground visibility map 310 from the modified viewpoint, the foreground image $I_T$ may represent image 302 from the modified viewpoint, and the background image $\tilde{I}_T$ may represent inpainted image 318 from the modified viewpoint.

Pixel projector 330 may additionally be configured to combine the foreground image $I_T$ with the background image $\tilde{I}_T$ in accordance with the modified foreground visibility map $A_T$. For example, pixel projector 330 may be configured to generate modified image 370 according to $I_T^* = A_T I_T + (1-A_T)\tilde{I}_T$, where $I_T^*$ represents modified image 370. Thus, modified image 370 may be primarily based on image 302 where values of foreground visibility map 310 are relatively high, and may be primarily based on inpainted depth image 320 where values of foreground visibility map 310 are relatively low. The visibility values of modified visibility map $A_T$ may be selected from and/or scaled to the same predetermined range as the values of foreground visibility map 310. For example, values of the modified foreground visibility map may range from zero to a predetermined value (e.g., $A_T \in [0, 1]^n$). Thus, modified image 370 may be based on a sum of (i) a first product of the foreground image and the modified foreground visibility map (i.e., $A_T I_T$) and (ii) a second product of the background image and a difference between a predetermined value and the modified foreground visibility map (i.e., $(1-A_T)\tilde{I}_T$).

In other implementations, pixel projector 330 may be configured to generate modified image 370 according to $I_T^* = \theta(A_T, I_T, \tilde{I}_T)$, where $\theta(\cdot)$ represents a machine learning model that has been trained to combine foreground image $I_T$ with background image $\tilde{I}_T$ in accordance with $A_T$. For example, this machine learning model may be trained using a plurality of training image sets, each of which includes a plurality of different views of a scene and thus represents the ground-truth pixel values of disoccluded regions.

Figure 3B:
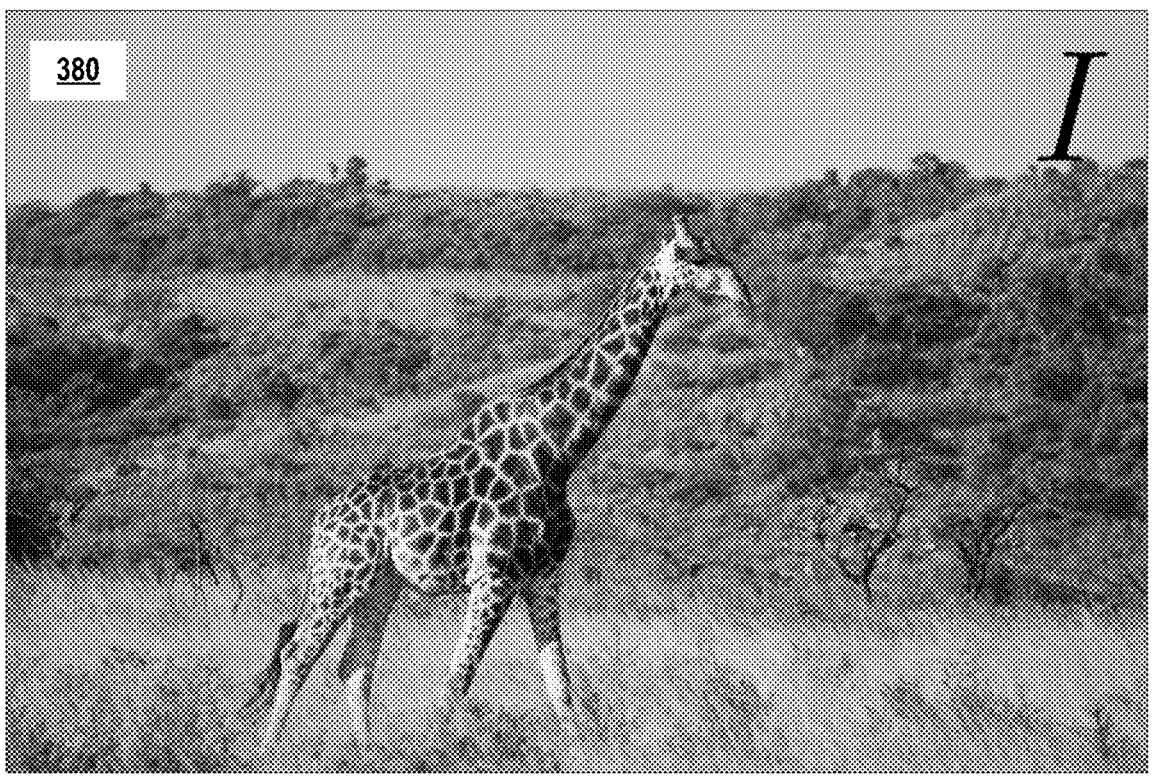
FIG. 3B illustrates an image and a depth image, in accordance with examples described herein.
Figure 3B:
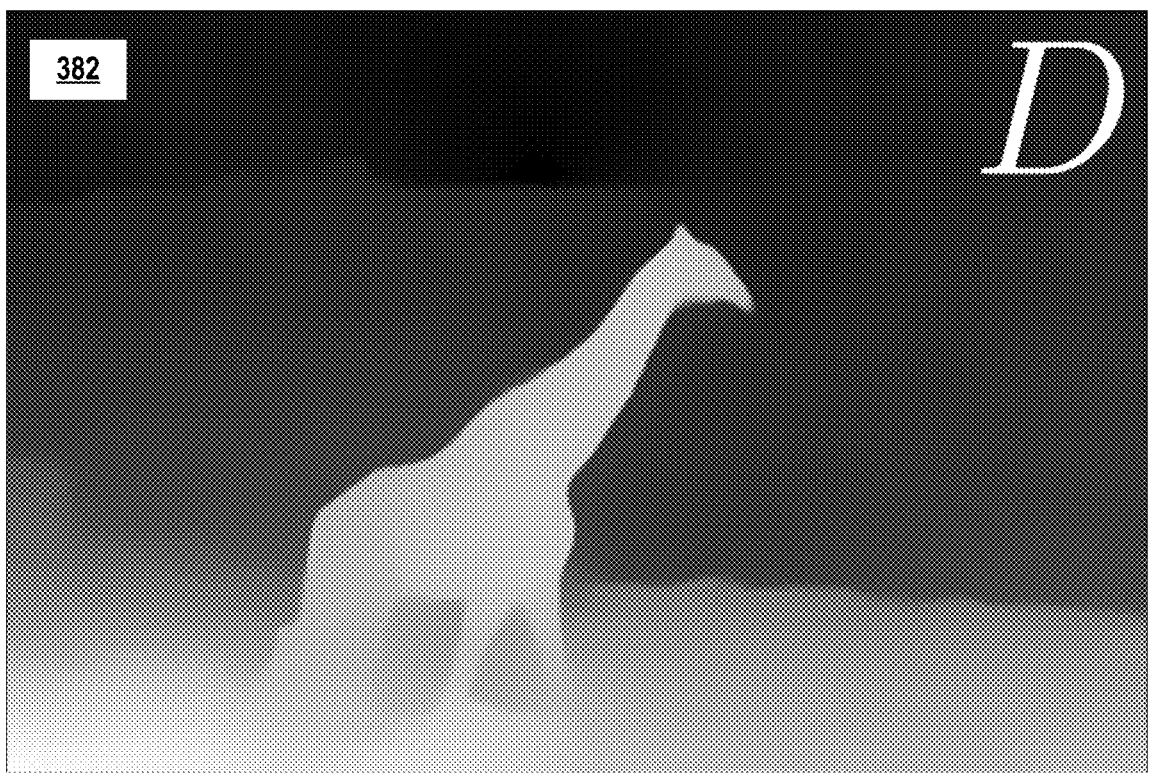
Figure 3C:
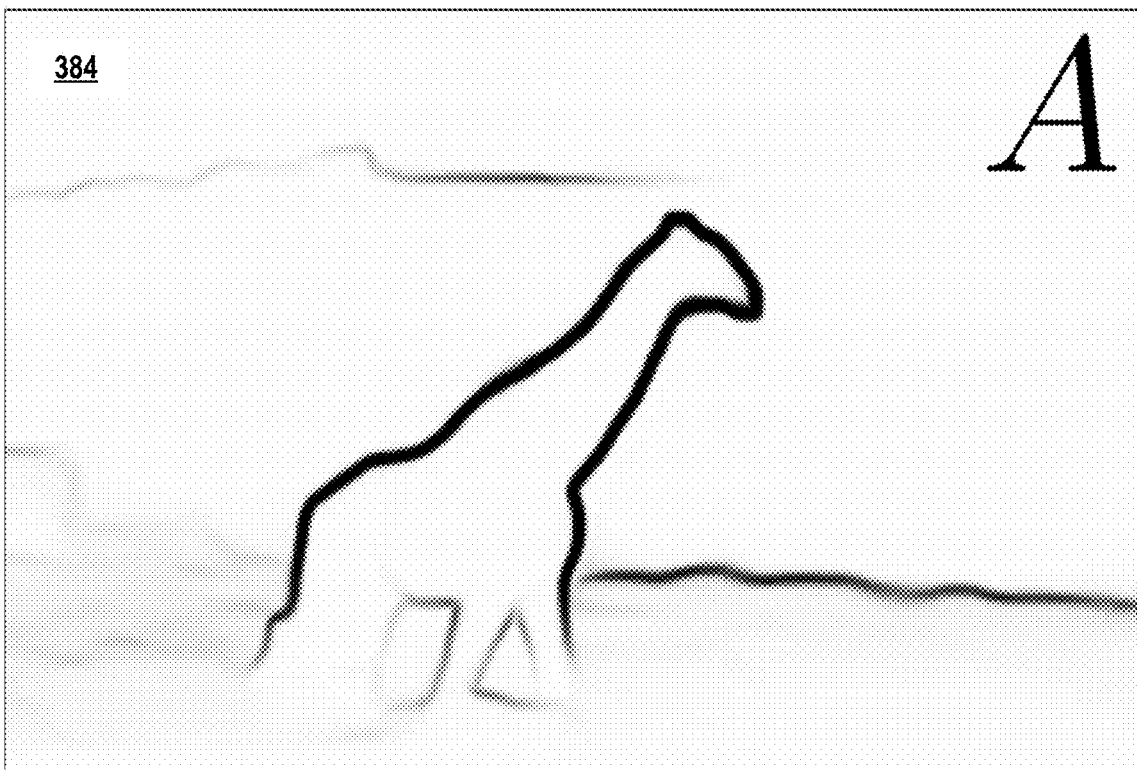
FIG. 3C illustrates visibility map and a background disocclusion mask, in accordance with examples described herein.
Figure 3C:
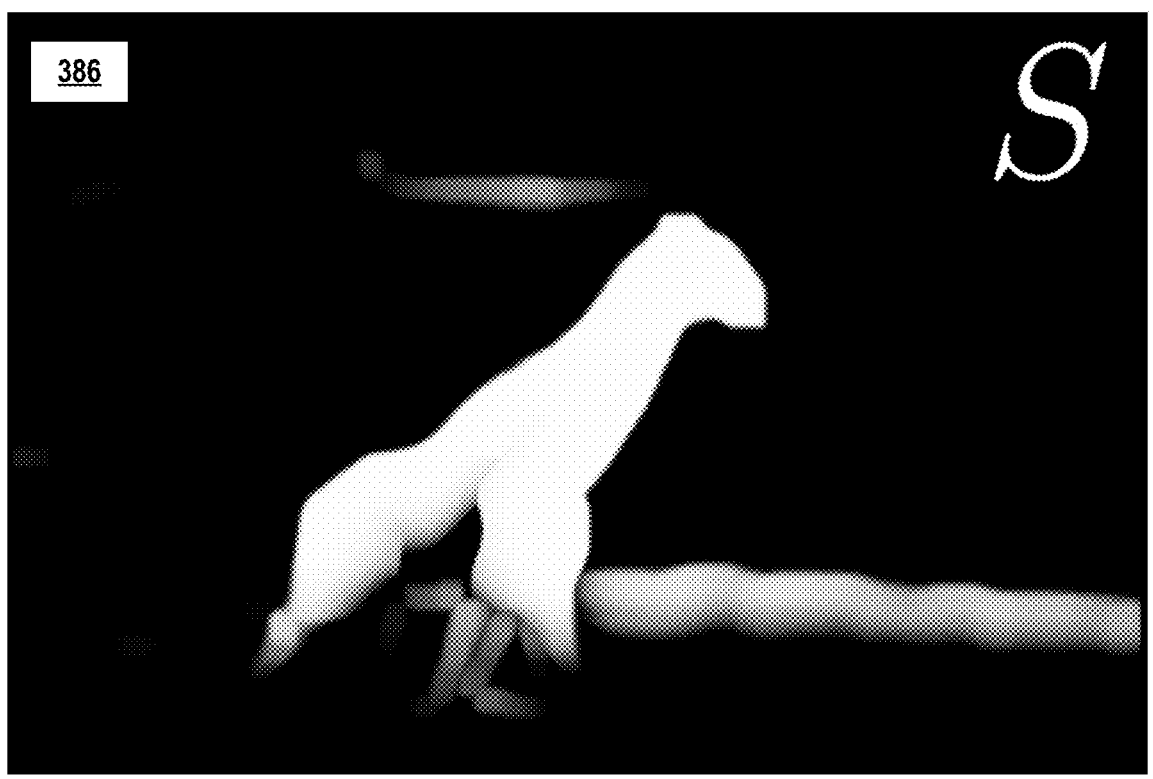
Figure 3D:
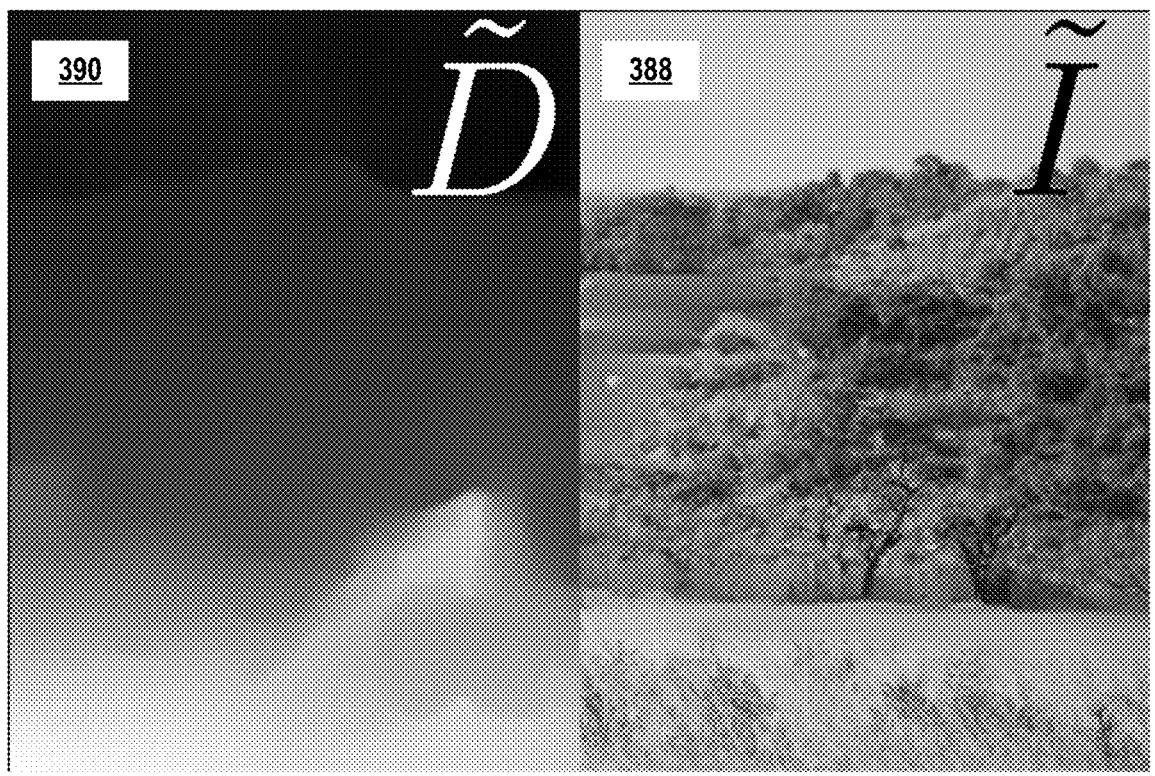
FIG. 3D illustrates an inpainted image, an inpainted depth image, and a modified image, in accordance with examples described herein.
Figure 3D:
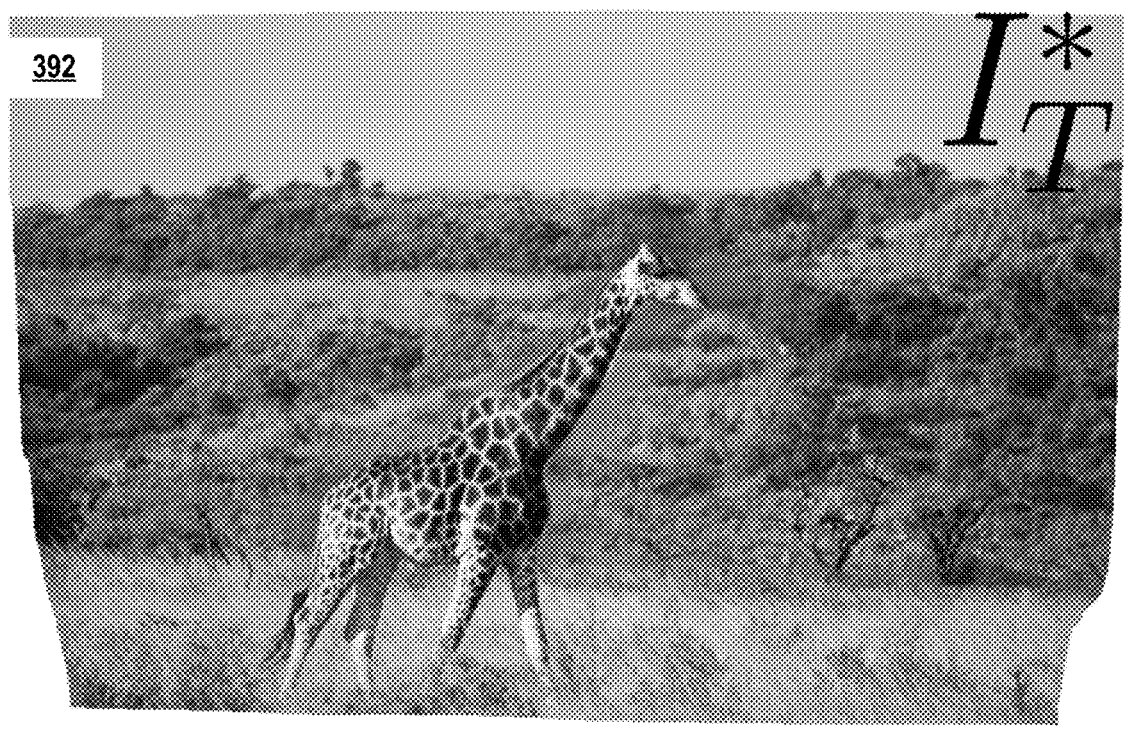

FIGS. 3B, 3C, and 3D contain examples of the images and maps generated by 3D photo system 300. Specifically, FIG. 3B includes image 380 (an example of image 302) and corresponding depth image 382 (an example of depth image 306). FIG. 3C includes foreground visibility map 384 (an example of foreground visibility map 310) and background disocclusion mask 386 (an example of background disocclusion mask 314), each of which corresponds to image 380 and depth image 382. FIG. 3D includes inpainted image 388 (an example of inpainted image 318), inpainted depth image 390 (an example of inpainted depth image 320), and modified image 392 (an example of modified image 370), each of which corresponds to image 380 and depth image 382.

Specifically, image 380 contains a giraffe (a foreground feature/object) against a background of grassland and trees (background features/objects). Depth image 382 indicates that the giraffe is closer to the camera than most parts of the background. In foreground visibility map 384, a maximum visibility value is shown in white, a minimum visibility value is shown in black, and values therebetween are shown using grayscale. Thus, regions around the giraffe, the top of the grassland, and the top of the tree line are shown in black and/or dark grayscale, indicating that the depth gradient is relatively high in these regions and that these regions are thus relatively more transparent to inpainted background pixel values after projection in three dimensions, as described above. In background disocclusion mask 386, a maximum disocclusion value is shown in white, a minimum disocclusion value is shown in black, and values therebetween are shown using grayscale. Thus, regions behind the giraffe and regions behind the top of the grassland are shown in white and/or light grayscale, indicating that these regions are likely to be disoccluded (i.e., made visible) by a change in the viewpoint from which image 380 is rendered.

In inpainted image 388 and in inpainted depth image 390, portions of image 380 and depth image 382 that previously represented the giraffe and top of the grassland have been inpainted using new values that correspond to the background portions of image 380 and depth image 382, rather than using values that correspond to the foreground portions of image 380 and depth image 382. Thus, images 388 and 390 represent images 380 and 382, respectively, with at least some of the foreground content replaced with newly-synthesized background content that is contextually-coherent (in terms of color/intensity and depth) with the background portions of images 380 and 382.

During rendering of modified image 392, the content of image 380 (foreground layer) may be combined with the inpainted content of inpainted image 388 (background layer) to fill in the disoccluded regions revealed by modification of the initial viewpoint of image 380. The blending ratio between images 380 and 388 is specified by foreground visibility map 384 after reprojection of images 380 and 388 and map 384 into the modified viewpoint. In particular, the blending ratio is specified by corresponding pixels of foreground visibility map 384 (after reprojection into the modified viewpoint), with the corresponding pixels being determined after unprojecting image 380, inpainted image 388, and foreground visibility map 384 to generate respective 3D representations and projection of these 3D representations into the modified viewpoint. Modified image 392 thus represents the content of image 380 from a modified viewpoint that is different from the initial viewpoint of image 380. Modified image 392 as shown is not exactly rectangular, since images 380 and 388 might not include content beyond the outer boundaries of image 380. In some cases, modified image 392 and/or one or more of the images on which it is based may undergo further inpainting so that modified image 392 is rectangular even after the viewpoint modification.

IV. EXAMPLE SOFT FOREGROUND VISIBILITY MODEL

Figure 4A:
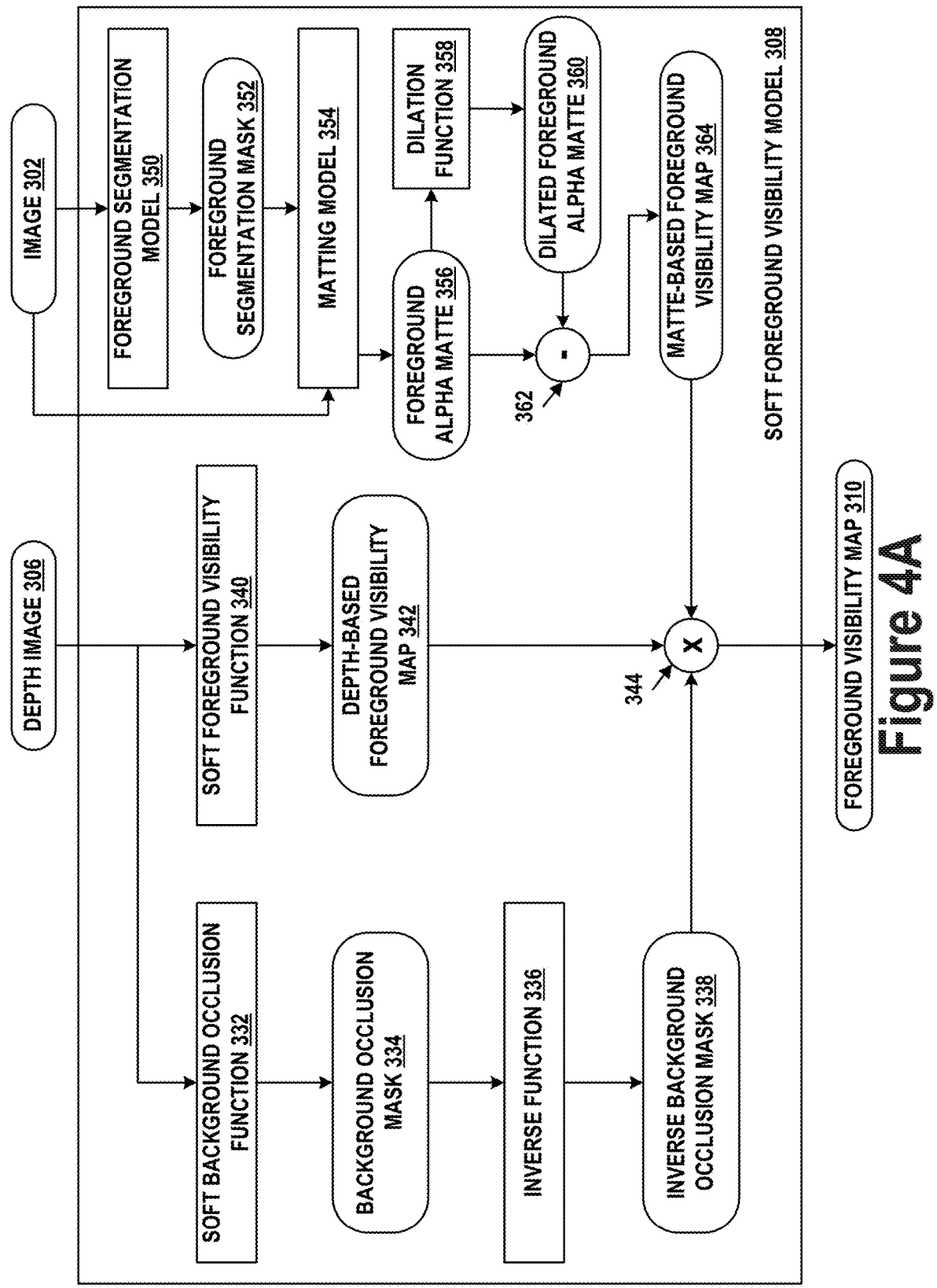
FIG. 4A illustrates a soft foreground visibility model, in accordance with examples described herein.

FIG. 4A illustrates aspects of soft foreground visibility model 308, which may be configured to generate foreground visibility map 310 based on depth image 306 and image 302. Specifically, soft foreground visibility model 308 may include soft background occlusion function 332, inverse function 336, soft foreground visibility function 340, foreground segmentation model 350, matting model 354, dilation function 358, difference operator 362, and multiplication operator 344.

Soft foreground visibility function 340 may be configured to generate depth-based foreground visibility map 342 based on depth image 306. Specifically, soft foreground visibility function may be expressed as $A_{DEPTH} = e^{-\|\nabla D\|^2}$, where $A_{DEPTH}$ represents depth-based foreground visibility map 342, $\nabla$ represents a gradient operator (e.g., the Sobel gradient operator), and $\beta$ is an adjustable scalar parameter. Thus, the foreground visibility value of a given pixel p of depth image 306 may be based on an exponential of the depth gradient $\nabla D(p)$ determined by applying the gradient operator to the given pixel p and one or more surrounding pixels.

In some implementations, depth-based foreground visibility map 342 may be equal to foreground visibility map 310. That is, soft background occlusion function 332, inverse function 336, foreground segmentation model 350, matting model 354, dilation function 358, difference operator 362, and/or multiplication operator 344 might be omitted from soft foreground visibility model 308. However, in some cases, depth image 306 might not accurately represent some thin and/or high-frequency features such as hair or fur (e.g., due to properties of depth model 304). In order to improve the representation of these thin and/or high-frequency features in modified image 370, depth-based foreground visibility map 342 may be combined with inverse background occlusion mask 338 and matte-based foreground visibility map 364 to generate foreground visibility map 310. Since depth-based foreground visibility map 342 is soft, depth-based foreground visibility map 342 may be combined with matte-based foreground segmentation techniques.

Foreground segmentation model 350 may be configured to generate foreground segmentation mask 352 based on image 302. Foreground segmentation mask 352 may distinguish foreground features of image 302 (e.g., denoted using a binary pixel value of 1) from background features of image 302 (e.g., using a binary pixel value of 0). Foreground segmentation mask 352 may distinguish foreground from background, but might not accurately represent thin and/or high-frequency features of foreground objects represented in image 302. Foreground segmentation model 350 may be implemented, for example, using the model discussed in a paper titled "U2-Net: Going Deeper with Nested U-Structure for Salient Object Detection," authored by Qin et al., and published as arXiv:2005.09007.

Matting model 354 may be configured to generate foreground alpha matte 356 based on image 302 and foreground segmentation mask 352. Foreground alpha matte 356 may distinguish foreground features of image 302 from background features of image 302, and may do so using one a binary value per pixel or a grayscale intensity value per pixel. Unlike foreground segmentation mask 352, foreground alpha matte 356 may accurately represent thin and/or high-frequency features (e.g., hair or fur) of foreground objects represented in image 302. Matting model 354 may be implemented, for example, using the model discussed in a paper titled "F, B, Alpha Matting," authored by Forte et al., and published as arXiv:2003.07711.

In order to incorporate foreground alpha matte 356 into foreground visibility map 310, foreground alpha matte 356 may undergo further processing. Specifically, foreground visibility map 310 is expected to include low visibility values around foreground object boundaries, but is not expected to include low visibility values in regions that are not near foreground object boundaries. Foreground alpha matte 356, however, includes low visibility values for all background regions. Thus, dilation function 358 may be configured to generate, based on foreground alpha matte 356, dilated foreground alpha matte 360, which may then be subtracted from foreground alpha matte 356, as indicated by difference operator 362, to generate matte-based foreground visibility map 364. Matte-based foreground visibility map 364 may thus include low visibility values around foreground object boundaries but not in background regions that are not near foreground object boundaries.

Additionally, soft background occlusion function 332 may be configured to generate background occlusion mask 334 based on depth image 306. Background occlusion mask 334 may alternatively be referred as soft background occlusion mask 334. Background occlusion mask 334 may be expressed as $\hat{S} \in R^n$, and may thus have n pixels, each of which may be associated with a corresponding occlusion value (which may be referred to as a background occlusion value). The occlusion values may be selected from and/or scaled to a predetermined range, such as 0 to 1 (i.e., $\hat{S} \in [0, 1]^n$).

Each respective occlusion value of background occlusion mask 334 may indicate a likelihood that a corresponding pixel of the image 302 will be occluded (i.e., covered up) by a change in the initial viewpoint of image 302. The computation of background occlusion mask 334 may be analogous to the computation of background disocclusion mask 314. Specifically, a given pixel associated with pixel location (x, y) may be occluded due to the change in the initial viewpoint if there exists a neighboring reference pixel $(x_i, y_j)$ such that a depth difference between (i) a depth value $D(x, y)$ associated with the given pixel and (ii) a depth value $D(x_i, y_j)$ associated with the neighboring reference pixel is less than a scaled distance $\rho K_{(x_i, y_j)}$ between these pixels' respective positions. That is, the given pixel at location (x, y) may be occluded if $\exists_{(x_i,y_j)}(D(x, y)-D(x_i, y_j)<\rho K_{(x_i,y_j)})$. Accordingly, soft background occlusion function 332 may be expressed as $\hat{S}_{(x,y)}=\tan h(\gamma(\max_{(x_i,y_j)}(D(x_i, y_j)-D(x, y)-\rho K_{(x_i,y_j)})))$, where $(x_i,y_j) \in N_{(x,y)}$ such that i and j are each iterated through a corresponding range to compare the given pixel (x,y) to a predetermined number of neighboring pixels $(x_i, y_j)$, and a ReLU or a leaky ReLU may be applied to the output of the hyperbolic tangent function to make $\hat{S}_{(x,y)}$ positive.

Thus, soft background occlusion function 332 may be configured to determine, for each respective pixel of depth image 306, a second plurality of difference values, where each respective difference value of the second plurality of difference values is determined by subtracting (i) the corresponding depth value $D(x,y)$ of the respective pixel and a scaled number of pixels $\rho K_{(x_i,y_j)}$ separating the respective pixel from a corresponding reference pixel located within a predetermined pixel distance of the respective pixel from (ii) the corresponding depth value $D(x_i, y_j)$ of the corresponding reference pixel. Further, soft background disocclusion function 312 may be configured to, for each respective pixel of depth image 306, determine a second maximum difference value of the second plurality of difference values (i.e., $\max_{(x_i,y_j)}(D(x_i, y_j)-D(x, y)-\rho K_{(x_i,y_j)})$), and determine the disocclusion value $\hat{S}_{(x,y)}$ by applying a hyperbolic tangent function to the second maximum difference value.

Inverse function 336 may be configured to generate inverse background occlusion mask 338 based on background occlusion mask 334. For example, when $\hat{S} \in [0, 1]^n$, inverse function 336 may be expressed as $\hat{S}^{-1}=1-\hat{S}$.

Foreground visibility map 310 may be determined based on a product of (i) depth-based foreground visibility map 342, (ii) matte-based foreground visibility map 364, and (iii) inverse background occlusion mask 338, as indicated by multiplication operator 344. Determining foreground visibility map 310 in this way may allow for representation of thin and/or high-frequency features of foreground objects, while accounting for depth discontinuities and reducing and/or avoiding "leakage" of matte-based foreground visibility map 364 onto too much background. Thus, the net effect of this multiplication is the incorporation into depth-based foreground visibility map 342 of the thin and/or high-frequency features around foreground object boundaries represented by matte-based foreground visibility map 364.

Figure 4B:
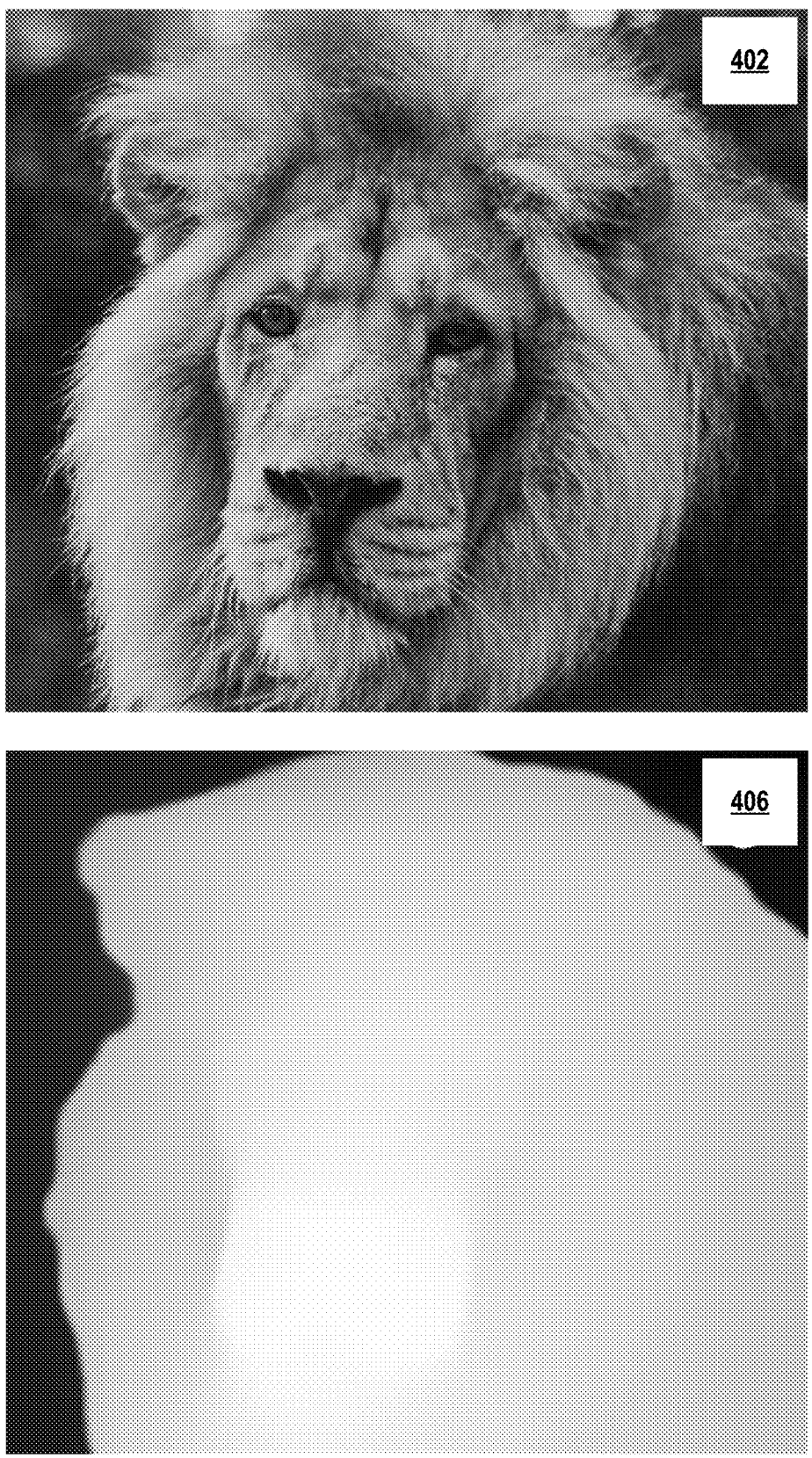
FIG. 4B illustrates an image and a depth image, in accordance with examples described herein.
Figure 4C:
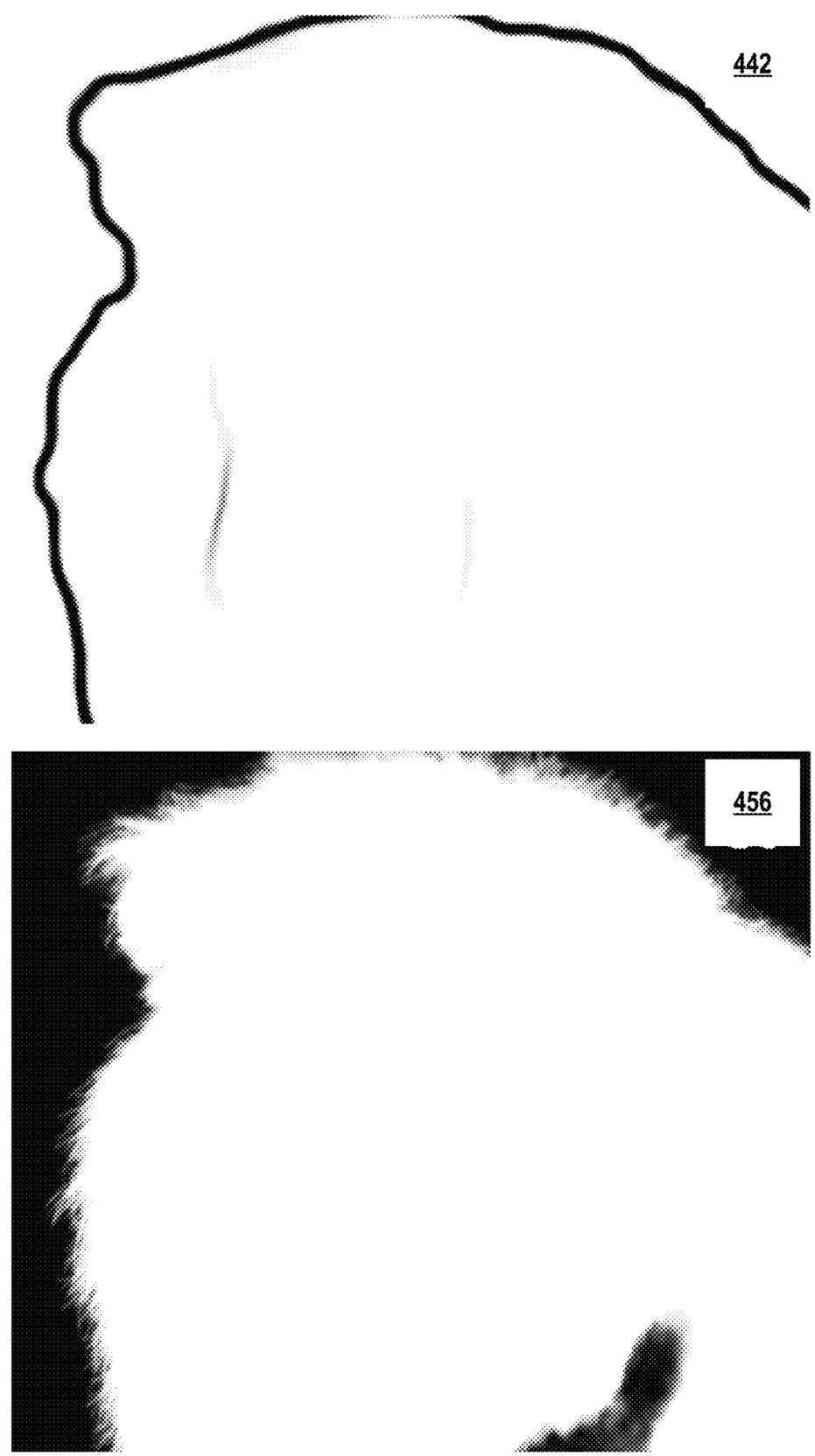
FIG. 4C illustrates a depth-based foreground visibility map and a foreground alpha matte, in accordance with examples described herein.
Figure 4D:
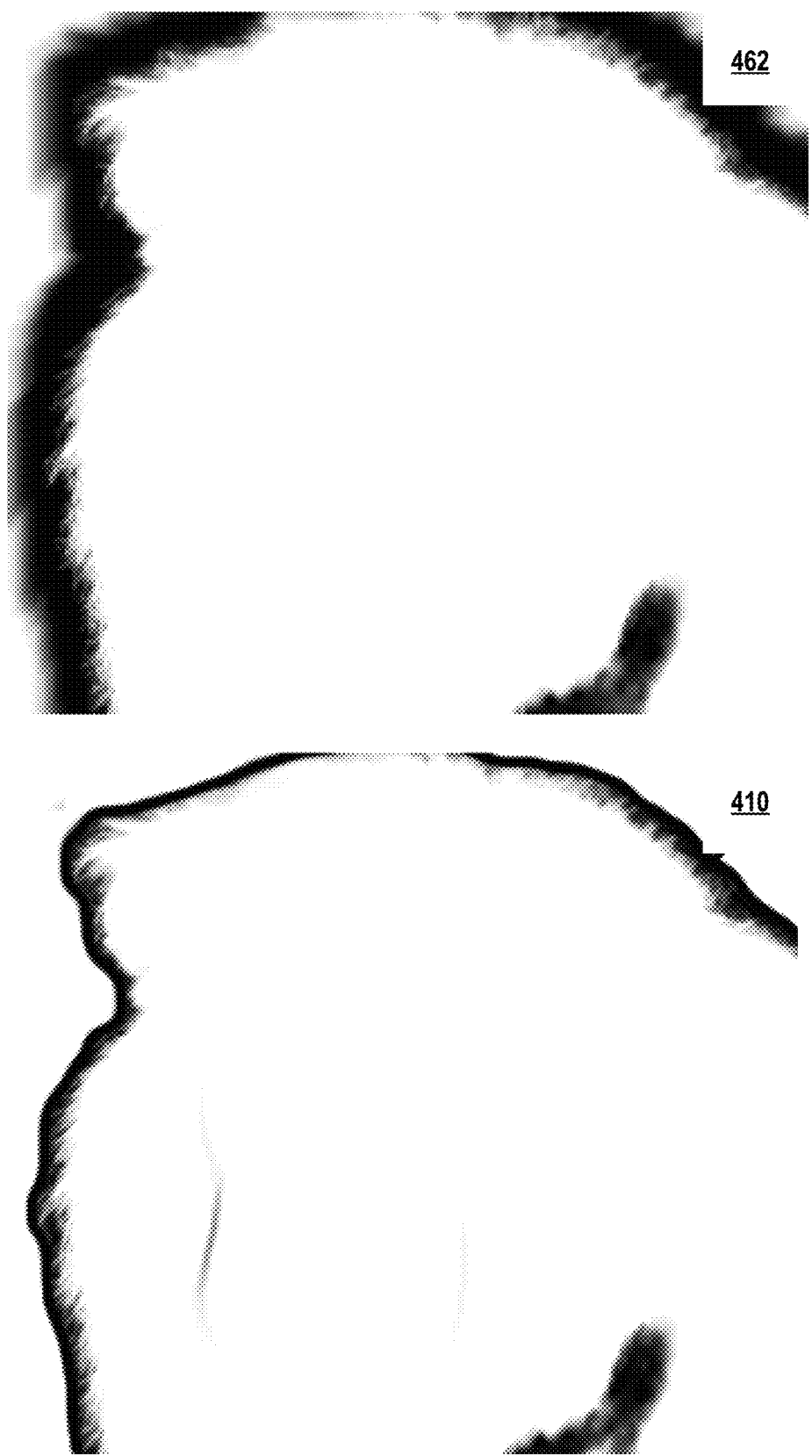
FIG. 4D illustrates a matte-based foreground visibility map and a foreground visibility map, in accordance with examples described herein.

FIGS. 4B, 4C, and 4D contain examples of the images and maps used and/or generated by soft foreground visibility model 308. Specifically, FIG. 4B includes image 402 (an example of image 302) and corresponding depth image 406 (an example of depth image 306). FIG. 4C includes depth-based foreground visibility map 442 (an example of depth-based foreground visibility map 342) and foreground alpha matte 456 (an example of foreground alpha matte 356), each of which corresponds to image 402 and depth image 406. FIG. 4D includes matte-based foreground visibility map 462 (an example of matte-based foreground visibility map 364) and foreground visibility map 410 (an example of foreground visibility map 310), each of which corresponds to image 402 and depth image 406.

Specifically, image 402 contains a lion (a foreground object) against a blurry background. Depth image 406 indicates that the lion is closer to the camera than the background, with the lion's snout being closer than other parts of the lion. Depth image 402 does not accurately represent the depth of some of the hairs in the lion's mane. In depth-based foreground visibility map 442 and foreground visibility map 410, a maximum visibility value is shown in white, a minimum visibility value is shown in black, and values therebetween are shown using grayscale. In foreground alpha matte 456 and matte-based foreground visibility map 462, a maximum alpha value is shown in white, a minimum alpha value is shown in black, and values therebetween are shown using grayscale. A maximum alpha value corresponds to a maximum visibility value, since both indicate that foreground content is completely opaque.

Thus, in depth-based foreground visibility map 442, outline regions representing a transition between the lion and the background, as well as between the lion's snout and other parts of the lion, are shown in darker grayscale, indicating that the depth gradient is relatively high in these outline regions and that these outline regions are relatively more transparent to inpainted background pixel values, while other regions are shown in lighter grayscale. In foreground alpha matte 456, the lion is shown in lighter grayscale, and the background is shown in darker grayscale. Unlike depth-based foreground visibility map 442, foreground alpha matte 456 represents in detail the hairs of the lion's mane. In matte-based foreground visibility map 462, the lion is shown in lighter grayscale, an outline region around the lion is shown in darker grayscale, and background portions beyond the outline region are shown in lighter grayscale. A size of this outline region is controllable by controlling a number of pixels by which dilation function 358 dilates foreground alpha matte 356.

In foreground visibility map 410, most of the lion is shown in lighter grayscale, outline regions around the lion and around the lion's snout are shown in darker grayscale, and background portions beyond the outline region are shown in lighter grayscale. The outline region of the lion in foreground visibility map 410 is smaller than the outline region of the lion in matte-based foreground visibility map 462 and includes detailed representations of the hairs of the lion's mane. Further, foreground visibility map 410 includes the outline region around the lion's snout, which is present in depth-based foreground visibility map 442 but absent from matte-based foreground visibility map 462. Foreground visibility map 410 thus represents depth-based discontinuities of image 402 as well as matte-based thin and/or high-frequency features of the lion's mane.

V. EXAMPLE TRAINING SYSTEM AND OPERATIONS

Figure 5A:
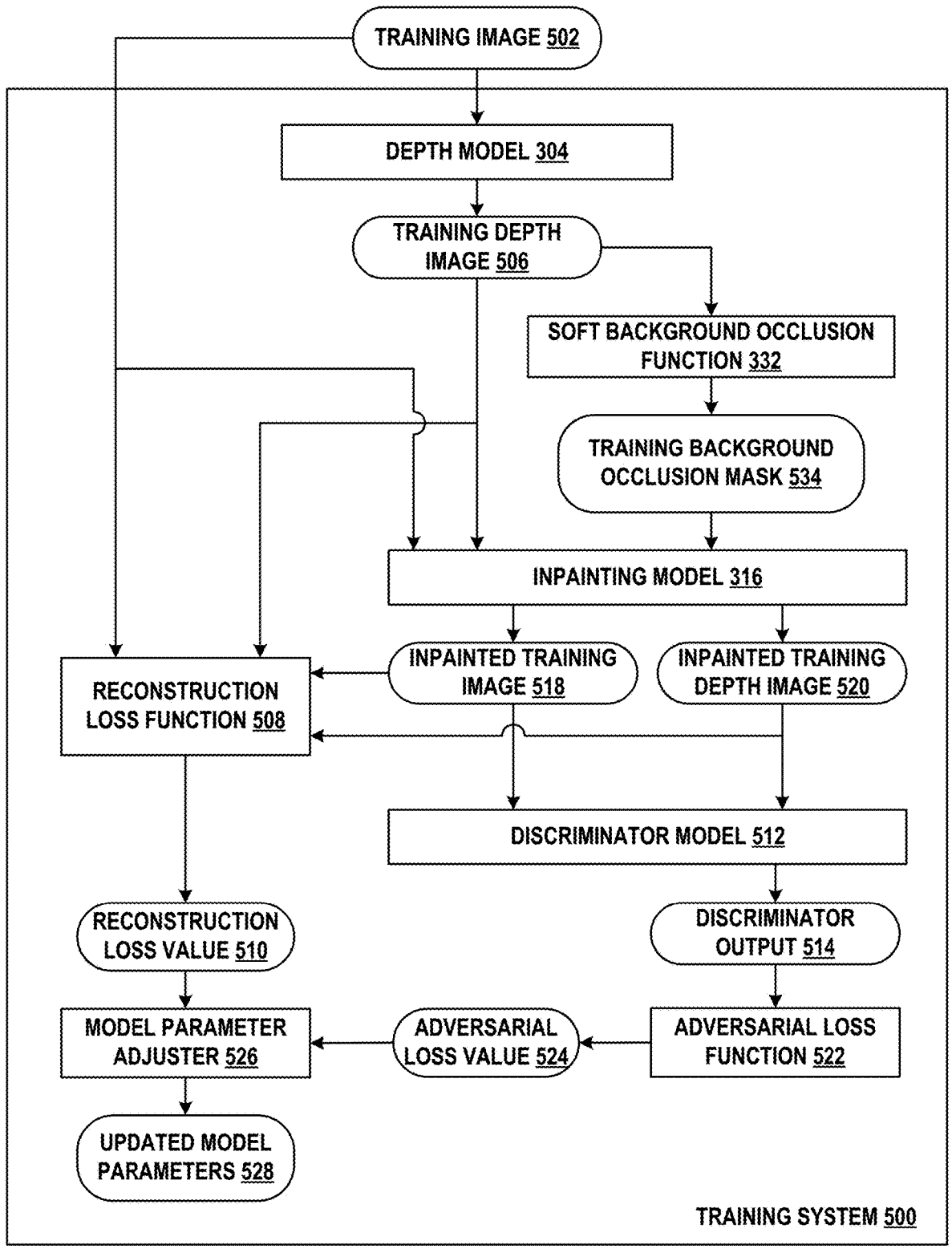
FIG. 5A illustrates a training system, in accordance with examples described herein.

FIG. 5A illustrates an example training system 500 that may be used to train one or more components of 3D photo system 300. Specifically, training system 500 may include depth model 304, soft background occlusion function 332, inpainting model 316, discriminator model 512, adversarial loss function 522, reconstruction loss function 508, and model parameter adjuster 526. Training system 500 may be configured to determine updated model parameters 528 based on training image 502. Training image 502 and training depth image 506 may be analogous to image 302 and depth image 306, respectively, but may be determined at training time rather than at inference time. Depth model 304 and soft background occlusion function 332 have been discussed with respect to FIG. 3A and FIG. 4A, respectively.

Inpainting model 316 may be trained to inpaint regions of image 302 that, as indicated by background disocclusion mask 314, may be disoccluded by a change in viewpoint. In some cases, however, ground-truth pixel values for these disoccluded regions might not be available (e.g., multiple view of training image 502 might not be available). Thus, rather than training inpainting model 316 using a training background disocclusion mask corresponding to training image 502, inpainting model 316 may instead be trained using training background occlusion mask 534. Training background occlusion mask 534 may be analogous to background occlusion mask 334, but may be determined at training time rather than at inference time. Since ground-truth pixel values for regions likely to be occluded by foreground features as a result of change in the initial viewpoint are available in training image 502, this technique may allow for training of inpainting model 316 without reliance on multi-view training image datasets. In cases where ground-truth data for disoccluded regions is available, inpainting model may additionally or alternatively be trained using disocclusion masks.

Specifically, inpainting model 316 may be configured to generate, based on training image 502, training depth image 506, and training background occlusion mask 534, inpainted training image 518 and inpainted training depth image 520, which may be analogous to inpainted image 318 and inpainted depth image 320, respectively. In some cases, inpainting model 316 may also be trained using stroke-shaped inpainting masks (not shown), thus allowing inpainting model 316 to learn to inpaint thin or small objects.

A quality with which inpainting model 316 inpaints missing regions of images 502 and 506 may be quantified using reconstruction loss function 508 and/or adversarial loss function. Reconstruction loss function 508 may be configured to generate reconstruction loss value 510 by comparing training images 502 and 506 to inpainted images 518 and 520, respectively. For example, reconstruction loss function 508 may be configured to determine (i) a first L−1 distance between training image 502 and inpainted training image 518 and (ii) a second L−1 distance between training depth image 506 and inpainted training depth image 520, at least with respect to regions that have been inpainted (as indicated by training background occlusion mask 534 and/or the stroke-shaped inpainting mask). Reconstruction loss function 508 may thus incentivize inpainting model 316 to generate inpainted intensity values and inpainted depth values that are (i) consistent with one another and (ii) based on background features (rather than foreground features) of training image 502.

Discriminator model 512 may be configured to generate discriminator output 514 based on inpainted training image 518 and inpainted training depth image 520. Specifically, discriminator output 514 may indicate whether discriminator model 512 estimates that inpainted training image 518 and inpainted training depth image 520 are generated by inpainting model 316 or are ground-truth images that have not been generated by inpainting model 316. Thus, inpainting model 316 and discriminator model 512 may implement an adversarial training architecture. Accordingly, adversarial loss function 522 may include, for example, a hinge adversarial loss, and may be configured to generate adversarial loss value 524 based on discriminator output 514. Adversarial loss function 522 may thus incentivize inpainting model 316 to generate inpainted intensity values and inpainted depth values that appear realistic, and thus accurately mimic natural scenes.

Model parameter adjuster 526 may be configured to determine updated model parameters 528 based on reconstruction loss value 510 and adversarial loss value 524 (and any other loss values that may be determined by training system 500). Model parameter adjuster 526 may be configured to determine a total loss value based on a weighted sum of these loss values, where the relative weight of the corresponding loss values may be an adjustable training parameter. Updated model parameters 528 may include one or more updated parameters of inpainting model 316, which may be expressed as ΔΘ. In some implementations, updated model parameters 528 may additionally include one or more updated parameters for one or more other components of 3D photo system 300, such as depth model 304 or soft foreground visibility model 308, among other possibilities, as well as for discriminator model 512.

Model parameter adjuster 526 may be configured to determine updated model parameters 528 by, for example, determining a gradient of the total loss function. Based on this gradient and the total loss value, model parameter adjuster 526 may be configured to select updated model parameters 528 that are expected to reduce the total loss value, and thus improve performance of 3D photo system 300. After applying updated model parameters 528 to at least inpainting model 316, the operations discussed above may be repeated to compute another instance of the total loss value and, based thereon, another instance of updated model parameters 528 may be determined and applied at least to inpainting model 316 to further improve the performance thereof. Such training of components of 3D photo system 300 may be repeated until, for example, the total loss value is reduced to below a target threshold loss value.

FIG. 5B includes background occlusion mask 544 (an example of background occlusion mask 334 and training background occlusion mask 534), which corresponds to a portion of image 380 and depth image 382 of FIG. 3B. In background occlusion mask 544, a maximum occlusion value is shown in white, a minimum occlusion value is shown in black, and values therebetween are shown using grayscale. Thus, regions around the giraffe are shown in white or light grayscale, indicating that these regions are likely to be occluded by a change in the viewpoint from which image 380 is rendered.

VI. ADDITIONAL EXAMPLE OPERATIONS

Figure 6:
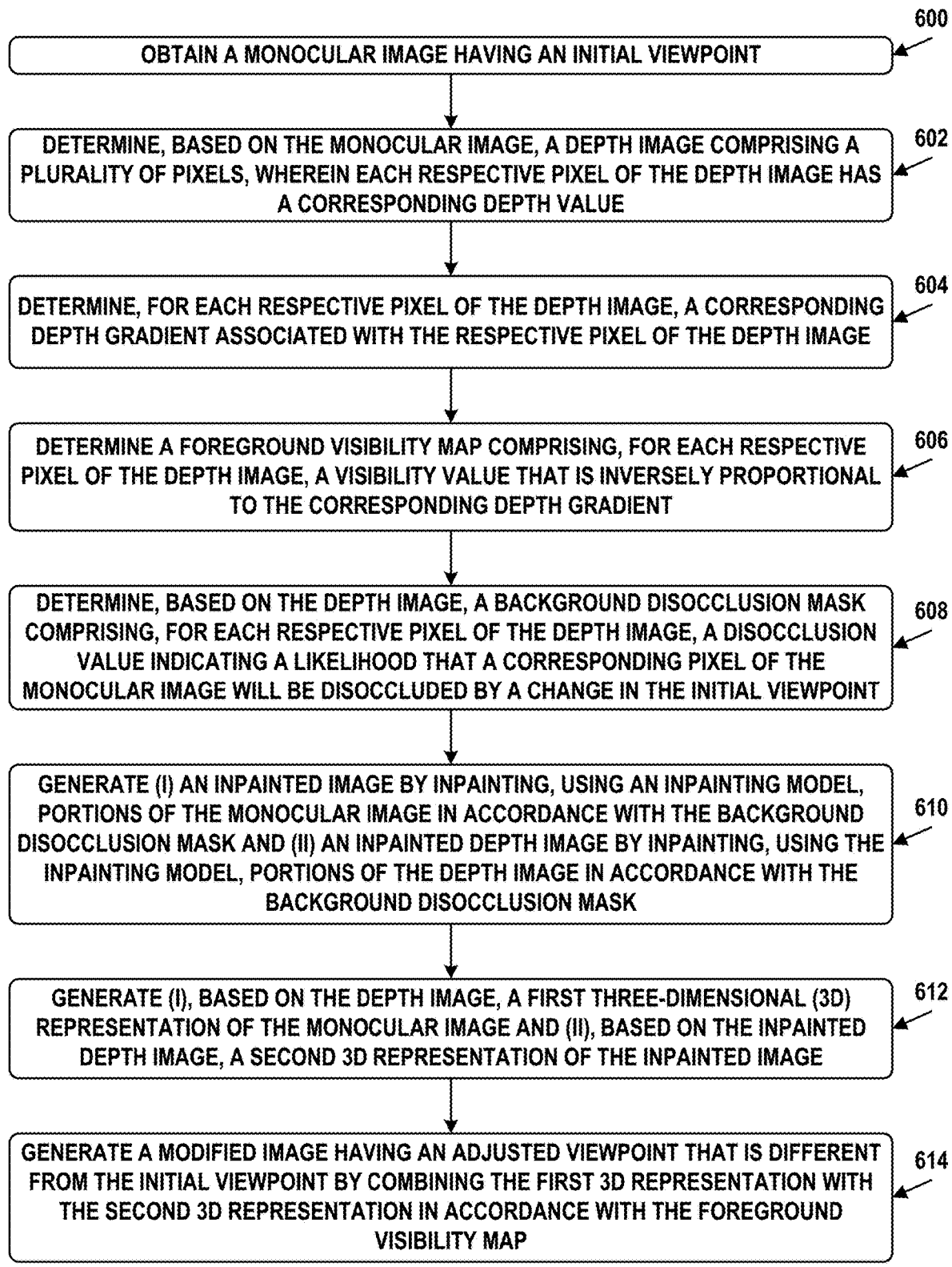
FIG. 6 includes a flow chart, in accordance with examples described herein.

FIG. 6 illustrates a flow chart of operations related to generating a 3D effect based on monoscopic images. The operations may be carried out by various computing device 100, computing system 200, 3D photo system 300, and/or training system 500, among other possibilities. The embodiments of FIG. 6 may be simplified by the removal of any one or more of the features shown therein. Further, these embodiments may be combined with features, aspects, and/or implementations of any of the previous figures or otherwise described herein.

Block 600 may involve obtaining a monocular image having an initial viewpoint.

Block 602 may involve determining, based on the monocular image, a depth image that includes a plurality of pixels. Each respective pixel of the depth image may have a corresponding depth value.

Block 604 may involve determining, for each respective pixel of the depth image, a corresponding depth gradient associated with the respective pixel of the depth image.

Block 606 may involve determining a foreground visibility map that includes, for each respective pixel of the depth image, a visibility value that is inversely proportional to the corresponding depth gradient.

Block 608 may involve determining, based on the depth image, a background disocclusion mask that includes, for each respective pixel of the depth image, a disocclusion value indicating a likelihood that a corresponding pixel of the monocular image will be disoccluded by a change in the initial viewpoint.

Block 610 may involve generating (i) an inpainted image by inpainting, using an inpainting model, portions of the monocular image in accordance with the background disocclusion mask and (ii) an inpainted depth image by inpainting, using the inpainting model, portions of the depth image in accordance with the background disocclusion mask.

Block 612 may involve generating (i), based on the depth image, a first 3D representation of the monocular image and (ii), based on the inpainted depth image, a second 3D representation of the inpainted image.

Block 614 may involve generating a modified image having an adjusted viewpoint that is different from the initial viewpoint by combining the first 3D representation with the second 3D representation in accordance with the foreground visibility map.

In some embodiments, the foreground visibility map may be determined by a soft foreground visibility function that is continuous and smooth along at least a first interval.

In some embodiments, determining the foreground visibility map include determining, for each respective pixel of the depth image, the corresponding depth gradient associated with the respective pixel by applying a gradient operator to the depth image, and determining, for each respective pixel of the depth image, the visibility value based on an exponential of the corresponding depth gradient associated with the respective pixel.

In some embodiments, the background disocclusion mask may be determined by a soft background disocclusion function that is continuous and smooth along at least a second interval.

In some embodiments, determining the background disocclusion mask may include determining, for each respective pixel of the depth image, a first plurality of difference values. Each respective difference value of the first plurality of difference values may be determined by subtracting, from the corresponding depth value of the respective pixel, (i) the corresponding depth value of a corresponding reference pixel located within a predetermined pixel distance of the respective pixel and (ii) a scaled number of pixels separating the respective pixel from the corresponding reference pixel.

Determining the background disocclusion mask may also include determining, for each respective pixel of the depth image, the disocclusion value based on the first plurality of difference values.

In some embodiments, determining the disocclusion value may include determining, for each respective pixel of the depth image, a first maximum difference value of the first plurality of difference values, and determining, for each respective pixel of the depth image, the disocclusion value by applying a hyperbolic tangent function to the first maximum difference value.

In some embodiments, the corresponding reference pixel of the respective difference value may be selected from: (i) a vertical scanline that includes a predetermined number of pixels above and below the respective pixel or (ii) a horizontal scanline that includes the predetermined number of pixels on a right side and on a left side of the respective pixel.

In some embodiments, determining the foreground visibility map may include determining a depth-based foreground visibility map that includes, for each respective pixel of the depth image, the visibility value that is inversely proportional to the corresponding depth gradient associated with the respective pixel of the depth image, and determining a foreground alpha matte based on and corresponding to the monocular image. Determining the foreground visibility map may also include determining a matte-based foreground visibility map based on a difference between (i) the foreground alpha matte and (ii) a dilation of the foreground alpha matte, and determining the foreground visibility map based on a product of (i) the depth-based foreground visibility map and (ii) the matte-based foreground visibility map.

In some embodiments, determining the foreground alpha matte may include determining, by a foreground segmentation model, a foreground segmentation based on the monocular image, and determining, by a matting model and based on the foreground segmentation and the monocular image, the foreground alpha matte.

In some embodiments, determining the foreground visibility map may include determining, based on the depth image, a background occlusion mask that includes, for each respective pixel of the depth image, an occlusion value indicating a likelihood that a corresponding pixel of the monocular image will be occluded by a change in the initial viewpoint. Determining the foreground visibility map may also include determining the foreground visibility map based on a product of (i) the depth-based foreground visibility map, (ii) the matte-based foreground visibility map, and (iii) an inverse of the background occlusion mask.

In some embodiments, determining the background occlusion mask may include determining, for each respective pixel of the depth image, a second plurality of difference values. Each respective difference value of the second plurality of difference values may be determined by subtracting (i) the corresponding depth value of the respective pixel and a scaled number of pixels separating the respective pixel from a corresponding reference pixel located within a predetermined pixel distance of the respective pixel from (ii) the corresponding depth value of the corresponding reference pixel. Determining the background occlusion mask may also include determining, for each respective pixel of the depth image, the occlusion value based on the second plurality of difference values.

In some embodiments, determining the occlusion value may include determining, for each respective pixel of the depth image, a second maximum difference value of the second plurality of difference values, and determining, for each respective pixel of the depth image, the occlusion value by applying a hyperbolic tangent function to the second maximum difference value.

In some embodiments, the monocular image may include a foreground feature and a background feature. The inpainting model may have been trained to inpaint (i) a disoccluded background region of the monocular image with intensity values that match the background feature and that are independent of the foreground feature and (ii) a corresponding disoccluded background region of the depth image with depth values that match the background feature and that are independent of the foreground feature.

In some embodiments, the inpainting model may have been trained such that the intensity values of the disoccluded region of the inpainted image are contextually-consistent with corresponding depth values of the corresponding disoccluded background regions of the inpainted depth image.

In some embodiments, the inpainting model may have been trained by a training process that includes obtaining a training monocular image and determining, based on the training monocular image, a training depth image. The training process may also include determining, based on the training depth image, a training background occlusion mask that includes, for each respective pixel of the training depth image, an occlusion value indicating a likelihood that a corresponding pixel of the training monocular image will be occluded by a change in an original viewpoint of the training monocular image. The training process may additionally include generating (i) an inpainted training image by inpainting, using the inpainting model, portions of the training monocular image in accordance with the training background occlusion mask and (ii) an inpainted training depth image by inpainting, using the inpainting model, portions of the training depth image in accordance with the training background occlusion mask. The training process may further include determining a loss value by applying a loss function to the inpainted training image and the inpainted training depth image, and adjusting one or more parameters of the inpainting model based on the loss value.

In some embodiments, the loss value may be based on one or more of: (i) an adversarial loss value determined based on processing the inpainted training image and the inpainted training depth image by a discriminator model or (ii) a reconstruction loss value determined based on comparing the inpainted training image to the training monocular image and comparing the inpainted training depth image to the training depth image.

In some embodiments, generating the modified image may include generating, based on the depth image, a 3D foreground visibility map corresponding to the first 3D representation. Generating the modified image may also include generating (i) a foreground image by projecting the first 3D representation based on the adjusted viewpoint, (ii) a background image by projecting the second 3D representation based on the adjusted viewpoint, and (iii) a modified foreground visibility map by projecting the 3D foreground visibility map based on the adjusted viewpoint. Generating the modified image may further include combining the foreground image with the background image in accordance with the modified foreground visibility map.

In some embodiments, values of the modified foreground visibility map may have a range of zero to a predetermined value. Combining the foreground image with the background image may include determining a sum of (i) a first product of the foreground image and the modified foreground visibility map and (ii) a second product of the background image and a difference between the predetermined value and the modified foreground visibility map.

In some embodiments, generating the first 3D representation and the second 3D representation may include generating (i) a first plurality of 3D points by unprojecting pixels of the monocular image based on the depth image and (ii) a second plurality of 3D points by unprojecting pixels of the inpainted image based on the inpainted depth image, and generating (i) a first polygon mesh by interconnecting respective subsets of the first plurality of 3D points that correspond to adjoining pixels of the monocular image and (ii) a second polygon mesh by interconnecting respective subsets of the second plurality of 3D points that correspond to adjoining pixels of the inpainted image. Generating the first 3D representation and the second 3D representation may also include applying (i) one or more first textures to the first polygon mesh based on the monocular image and (ii) one or more second textures to the second polygon mesh based on the inpainted image.

VII. EXAMPLE PERFORMANCE METRICS

FIGS. 7A, 7B, and 7C each include a respective table containing results of testing various 3D photo models against a corresponding dataset. Specifically, each of FIGS. 7A, 7B, and 7C compares the performance of the SynSin model (described in a paper titled "SynSin: End-to-end View Synthesis from a Single Image," authored by Wiles et al., and published as "arXiv:1912.08804"), the SMPI model (described in a paper titled "Single-View View Synthesis with Multiplane Images," authored by Tucker et al., and published as arXiv:2004.11364), the 3D-Photo model (described in a paper titled "3D Photography using Context-aware Layered Depth Inpainting," authored by Shih et al., and published as arXiv:2004.04727), and 3D photo system 300 as described herein.

Performance is quantified by the Learned Perceptual Image Patch Similarity (LPIPS) metric (lower values indicated better performance), the peak signal-to-noise ratio (PSNR) (higher values indicate better performance), and the structural similarity index measure (SSIM) (higher values indicate better performance). The results in FIGS. 7A, 7B, and 7C correspond, respectively, to the RealEstate10k image dataset (discussed in a paper titled "Stereo Magnification: Learning View Synthesis using Multiplane Images," authored by Zhou et al., and published as arXiv: 1805.09817), the Dual-Pixels image dataset (discussed in a paper titled "Learning Single Camera Depth Estimation using Dual-Pixels," authored by Garg et al., and published as arXiv:1904.05822), and the Mannequin-Challenger image dataset (discussed in a paper titled "Learning the Depths of Moving People by Watching Frozen People," authored by Li et al., and published as arXiv:1904.11111).

In FIG. 7A, "T-5" and "T=10" indicates that the corresponding metrics are computed for a test image with respect to a modified viewpoint corresponding to an image that is 5 and 10, respectively, time steps away from the test image. In FIG. 7B, the corresponding metrics are computed for a test image with respect to modified viewpoints corresponding to four images that are simultaneously captured with the test image. In FIGS. 7C, the corresponding metrics are computed for a test image with respect to modified viewpoints corresponding to four images that are subsequent to and consecutive with the test image. As indicated by the hatched pattern in the respective bottommost row of the table in each of FIGS. 7A, 7B, and 7C, system 300 outperforms the other models on all metrics for the Dual-Pixels and Mannequin-Challenge image datasets, and outperforms or ties with the other systems on all metrics for the RealEstate10k dataset. Thus, 3D photo system 300 matches or exceeds the performance of other 3D photo systems.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining a monocular image having an initial viewpoint;
determining, based on the monocular image, a depth image comprising a plurality of pixels, wherein each respective pixel of the depth image has a corresponding depth value;
determining, for each respective pixel of the depth image, a corresponding depth gradient associated with the respective pixel of the depth image;
determining a foreground visibility map comprising, for each respective pixel of the depth image, a visibility value that is inversely proportional to the corresponding depth gradient;
determining, based on the depth image, a background disocclusion mask comprising, for each respective pixel of the depth image, a disocclusion value indicating a likelihood that a corresponding pixel of the monocular image will be disoccluded by a change in the initial viewpoint;
generating (i) an inpainted image by inpainting, using an inpainting model, portions of the monocular image in accordance with the background disocclusion mask and (ii) an inpainted depth image by inpainting, using the inpainting model, portions of the depth image in accordance with the background disocclusion mask;
generating (i), based on the depth image, a first three-dimensional (3D) representation of the monocular image and (ii), based on the inpainted depth image, a second 3D representation of the inpainted image; and
generating a modified image having an adjusted viewpoint that is different from the initial viewpoint by combining the first 3D representation with the second 3D representation in accordance with the foreground visibility map.

2. The computer-implemented method of claim 1, wherein the foreground visibility map is determined by a soft foreground visibility function that is continuous and smooth along at least a first interval.

3. The computer-implemented method of claim 1, wherein determining the foreground visibility map comprises:
determining, for each respective pixel of the depth image, the corresponding depth gradient associated with the respective pixel by applying a gradient operator to the depth image; and
determining, for each respective pixel of the depth image, the visibility value based on an exponential of the corresponding depth gradient associated with the respective pixel.

4. The computer-implemented method of claim 1, wherein the background disocclusion mask is determined by a soft background disocclusion function that is continuous and smooth along at least a second interval.

5. The computer-implemented method of claim 1, wherein determining the background disocclusion mask comprises:
determining, for each respective pixel of the depth image, a first plurality of difference values, wherein each respective difference value of the first plurality of difference values is determined by subtracting, from the corresponding depth value of the respective pixel, (i) the corresponding depth value of a corresponding reference pixel located within a predetermined pixel distance of the respective pixel and (ii) a scaled number of pixels separating the respective pixel from the corresponding reference pixel; and
determining, for each respective pixel of the depth image, the disocclusion value based on the first plurality of difference values.

6. The computer-implemented method of claim 5, wherein determining the disocclusion value comprises:
determining, for each respective pixel of the depth image, a first maximum difference value of the first plurality of difference values; and
determining, for each respective pixel of the depth image, the disocclusion value by applying a hyperbolic tangent function to the first maximum difference value.

7. The computer-implemented method of claim 5, wherein the corresponding reference pixel of the respective difference value is selected from: (i) a vertical scanline comprising a predetermined number of pixels above and below the respective pixel or (ii) a horizontal scanline comprising the predetermined number of pixels on a right side and on a left side of the respective pixel.

8. The computer-implemented method of claim 1, wherein determining the foreground visibility map comprises:
determining a depth-based foreground visibility map comprising, for each respective pixel of the depth image, the visibility value that is inversely proportional to the corresponding depth gradient associated with the respective pixel of the depth image;
determining a foreground alpha matte based on and corresponding to the monocular image;
determining a matte-based foreground visibility map based on a difference between the foreground alpha matte and (ii) a dilation of the foreground alpha matte; and
(i) determining the foreground visibility map based on a product of (i) the depth-based foreground visibility map and (ii) the matte-based foreground visibility map.

9. The computer-implemented method of claim 8, wherein determining the foreground alpha matte comprises:

determining, by a foreground segmentation model, a foreground segmentation based on the monocular image; and determining, by a matting model and based on the foreground segmentation and the monocular image, the foreground alpha matte.

10. The computer-implemented method of claim 8, wherein determining the foreground visibility map comprises:

determining, based on the depth image, a background occlusion mask comprising, for each respective pixel of the depth image, an occlusion value indicating a likelihood that a corresponding pixel of the monocular image will be occluded by a change in the initial viewpoint; and determining the foreground visibility map based on a product of (i) the depth-based foreground visibility map, (ii) the matte-based foreground visibility map, and (iii) an inverse of the background occlusion mask.

11. The computer-implemented method of claim 10, wherein determining the background occlusion mask comprises:

determining, for each respective pixel of the depth image, a second plurality of difference values, wherein each respective difference value of the second plurality of difference values is determined by subtracting (i) the corresponding depth value of the respective pixel and a scaled number of pixels separating the respective pixel from a corresponding reference pixel located within a predetermined pixel distance of the respective pixel from (ii) the corresponding depth value of the corresponding reference pixel; and determining, for each respective pixel of the depth image, the occlusion value based on the second plurality of difference values.

12. The computer-implemented method of claim 11, wherein determining the occlusion value comprises:

determining, for each respective pixel of the depth image, a second maximum difference value of the second plurality of difference values; and determining, for each respective pixel of the depth image, the occlusion value by applying a hyperbolic tangent function to the second maximum difference value.

13. The computer-implemented method of claim 1, wherein the monocular image comprises a foreground feature and a background feature, wherein the inpainting model has been trained to inpaint (i) a disoccluded background region of the monocular image with intensity values that match the background feature and that are independent of the foreground feature and (ii) a corresponding disoccluded background region of the depth image with depth values that match the background feature and that are independent of the foreground feature, and wherein the intensity values of the disoccluded region of the inpainted image are contextually-consistent with corresponding depth values of the corresponding disoccluded background regions of the inpainted depth image.

14. The computer-implemented method of claim 1, wherein the inpainting model has been trained by a training process comprising:

obtaining a training monocular image;

determining, based on the training monocular image, a training depth image;

determining, based on the training depth image, a training background occlusion mask comprising, for each respective pixel of the training depth image, an occlusion value indicating a likelihood that a corresponding pixel of the training monocular image will be occluded by a change in an original viewpoint of the training monocular image;

generating (i) an inpainted training image by inpainting, using the inpainting model, portions of the training monocular image in accordance with the training background occlusion mask and (ii) an inpainted training depth image by inpainting, using the inpainting model, portions of the training depth image in accordance with the training background occlusion mask;

determining a loss value by applying a loss function to the inpainted training image and the inpainted training depth image; and adjusting one or more parameters of the inpainting model based on the loss value.

15. The computer-implemented method of claim 14, wherein the loss value is based on one or more of: (i) an adversarial loss value determined based on processing the inpainted training image and the inpainted training depth image by a discriminator model or (ii) a reconstruction loss value determined based on comparing the inpainted training image to the training monocular image and comparing the inpainted training depth image to the training depth image.

16. The computer-implemented method of claim 1, wherein generating the modified image comprises:

generating, based on the depth image, a 3D foreground visibility map corresponding to the first 3D representation;

generating (i) a foreground image by projecting the first 3D representation based on the adjusted viewpoint, (ii) a background image by projecting the second 3D representation based on the adjusted viewpoint, and (iii) a modified foreground visibility map by projecting the 3D foreground visibility map based on the adjusted viewpoint; and combining the foreground image with the background image in accordance with the modified foreground visibility map.

17. The computer-implemented method of claim 16, wherein values of the modified foreground visibility map have a range of zero to a predetermined value, and wherein combining the foreground image with the background image comprises:

determining a sum of (i) a first product of the foreground image and the modified foreground visibility map and (ii) a second product of the background image and a difference between the predetermined value and the modified foreground visibility map.

18. The computer-implemented method of claim 1, wherein generating the first 3D representation and the second 3D representation comprises:

generating (i) a first plurality of 3D points by unprojecting pixels of the monocular image based on the depth image and (ii) a second plurality of 3D points by unprojecting pixels of the inpainted image based on the inpainted depth image;

generating (i) a first polygon mesh by interconnecting respective subsets of the first plurality of 3D points that correspond to adjoining pixels of the monocular image and (ii) a second polygon mesh by interconnecting respective subsets of the second plurality of 3D points that correspond to adjoining pixels of the inpainted image; and applying (i) one or more first textures to the first polygon mesh based on the monocular image and (ii) one or more second textures to the second polygon mesh based on the inpainted image.

19. A system comprising:
a processor; and
a non-transitory computer-readable medium having stored thereon instructions that, when executed by the processor, cause the processor to perform operations comprising:
    obtaining a monocular image having an initial viewpoint;
    determining, based on the monocular image, a depth image comprising a plurality of pixels, wherein each respective pixel of the depth image has a corresponding depth value;
    determining, for each respective pixel of the depth image, a corresponding depth gradient associated with the respective pixel of the depth image;
    determining a foreground visibility map comprising, for each respective pixel of the depth image, a visibility value that is inversely proportional to the corresponding depth gradient;
    determining, based on the depth image, a background disocclusion mask comprising, for each respective pixel of the depth image, a disocclusion value indicating a likelihood that a corresponding pixel of the monocular image will be disoccluded by a change in the initial viewpoint;
    generating (i) an inpainted image by inpainting, using an inpainting model, portions of the monocular image in accordance with the background disocclusion mask and (ii) an inpainted depth image by inpainting, using the inpainting model, portions of the depth image in accordance with the background disocclusion mask;
    generating (i), based on the depth image, a first three-dimensional (3D) representation of the monocular image and (ii), based on the inpainted depth image, a second 3D representation of the inpainted image; and
    generating a modified image having an adjusted viewpoint that is different from the initial viewpoint by combining the first 3D representation with the second 3D representation in accordance with the foreground visibility map.

20. A non-transitory computer-readable medium having stored thereon instructions that, when executed by a computing device, cause the computing device to perform operations comprising:
    obtaining a monocular image having an initial viewpoint;
    determining, based on the monocular image, a depth image comprising a plurality of pixels, wherein each respective pixel of the depth image has a corresponding depth value;
    determining, for each respective pixel of the depth image, a corresponding depth gradient associated with the respective pixel of the depth image;
    determining a foreground visibility map comprising, for each respective pixel of the depth image, a visibility value that is inversely proportional to the corresponding depth gradient;
    determining, based on the depth image, a background disocclusion mask comprising, for each respective pixel of the depth image, a disocclusion value indicating a likelihood that a corresponding pixel of the monocular image will be disoccluded by a change in the initial viewpoint;
    generating (i) an inpainted image by inpainting, using an inpainting model, portions of the monocular image in accordance with the background disocclusion mask and (ii) an inpainted depth image by inpainting, using the inpainting model, portions of the depth image in accordance with the background disocclusion mask;
    generating (i), based on the depth image, a first three-dimensional (3D) representation of the monocular image and (ii), based on the inpainted depth image, a second 3D representation of the inpainted image; and
    generating a modified image having an adjusted viewpoint that is different from the initial viewpoint by combining the first 3D representation with the second 3D representation in accordance with the foreground visibility map.

* * * * *